(12) United States Patent
Stimits et al.

(10) Patent No.: US 11,749,822 B2
(45) Date of Patent: Sep. 5, 2023

(54) COMPACT EFFICIENT HYDROGEN REACTOR

(71) Applicant: Intelligent Energy Inc., San Jose, CA (US)

(72) Inventors: Jason L. Stimits, Loughborough (GB); Russell Barton, Loughborough (GB); Douglas A. Knight, Loughborough (GB); Iain M. Fraser, Loughborough (GB); Hao Huang, Loughborough (GB); Sandra H. Withers-Kirby, Loughborough (GB); Philbert C. Spencer, Loughborough (GB); Piotr Marcin Kleszyk, Loughborough (GB); Hossein Ostadi, Loughborough (GB)

(73) Assignee: Intelligent Energy Inc., San Jose, CA (US)

( * ) Notice: Subject to any disclaimer, the term of this patent is extended or adjusted under 35 U.S.C. 154(b) by 0 days.

(21) Appl. No.: 17/686,266

(22) Filed: Mar. 3, 2022

(65) Prior Publication Data

US 2022/0190371 A1 Jun. 16, 2022

Related U.S. Application Data

(62) Division of application No. 16/809,178, filed on Mar. 4, 2020, now abandoned.

(51) Int. Cl.
*H01M 8/0612* (2016.01)
*B01J 19/28* (2006.01)
(Continued)

(52) U.S. Cl.
CPC ........... *H01M 8/0631* (2013.01); *B01J 19/28* (2013.01); *C01B 3/065* (2013.01); *C01B 3/08* (2013.01);
(Continued)

(58) Field of Classification Search
CPC .. H01M 8/0631; H01M 8/04089; B01J 19/28; C01B 3/065; C01B 3/08
See application file for complete search history.

(56) References Cited

U.S. PATENT DOCUMENTS

| 7,271,567 B2 | 9/2007 | Dunn et al. |
| 7,393,369 B2 | 7/2008 | Shurtleff |
(Continued)

FOREIGN PATENT DOCUMENTS

CN 105152230 B 1/2017

OTHER PUBLICATIONS

International Patent Application No. PCT/US2018/049561; Int'l Written Opinion and Search Report; dated Jan. 2, 2019; 8 pages.

*Primary Examiner* — Matthew J Merkling
(74) *Attorney, Agent, or Firm* — Bakerhostetler LLP

(57) ABSTRACT

Methods and devices and aspects thereof for generating power using PEM fuel cell power systems comprising a rotary bed (or rotatable) reactor for hydrogen generation are disclosed. Hydrogen is generated by the hydrolysis of fuels such as lithium aluminum hydride and mixtures thereof. Water required for hydrolysis may be captured from the fuel cell exhaust. Water is preferably fed to the reactor in the form of a mist generated by an atomizer. An exemplary 750 We-h, 400 We PEM fuel cell power system may be characterized by a specific energy of about 550 We-h/kg and a specific power of about 290 We/kg. Turbidity fixtures within the reactor increase turbidity of fuel pellets within the reactor and improve the energy density of the system.

9 Claims, 18 Drawing Sheets

(51) Int. Cl.
    *C01B 3/06*         (2006.01)
    *C01B 3/08*         (2006.01)
    *H01M 8/04089*   (2016.01)
    *H01M 8/10*         (2016.01)

(52) U.S. Cl.
    CPC ... *H01M 8/04089* (2013.01); *C01B 2203/066* (2013.01); *H01M 2008/1095* (2013.01); *Y02E 60/36* (2013.01)

(56) References Cited

U.S. PATENT DOCUMENTS

| | | |
|---|---|---|
| 7,438,732 B2 | 10/2008 | Shurtleff et al. |
| 8,263,277 B2 | 9/2012 | Davies et al. |
| 8,323,846 B2 | 12/2012 | Benson |
| 8,357,213 B2 | 1/2013 | Patton et al. |
| 8,636,961 B2 | 1/2014 | Sgroi, Jr. et al. |
| 9,005,572 B2 | 4/2015 | Eickhoff |
| 2004/0131541 A1 | 7/2004 | Andersen |
| 2006/0165568 A1* | 7/2006 | Yoshizaki ............... C01B 3/065 422/209 |
| 2009/0025293 A1 | 1/2009 | Patton et al. |
| 2009/0205297 A1 | 8/2009 | Sakakida et al. |
| 2009/0324452 A1 | 12/2009 | Salinas et al. |
| 2011/0052487 A1* | 3/2011 | Davis ..................... C01B 3/065 423/657 |
| 2014/0170034 A1 | 6/2014 | Brown |
| 2015/0118588 A1 | 4/2015 | McLean et al. |
| 2017/0144125 A1 | 5/2017 | Vyas et al. |

\* cited by examiner

COMPACT EFFICIENT HYDROGEN REACTOR

CROSS-REFERENCE TO RELATED APPLICATIONS

This application is a Divisional application of U.S. patent application Ser. No. 16/809,178, filed Mar. 4, 2020, which is a Continuation application of International Patent Application No. PCT/US2018/049561 filed Sep. 5, 2018, which claims the benefit of U.S. Provisional Patent Application No. 62/554,495 filed Sep. 5, 2017, the entire contents of which are incorporated by reference herein.

FIELD

The present disclosure relates to methods and devices for PEM fuel cell power systems with efficient hydrogen generation. In particular, it relates to using rotary bed reactors to generate hydrogen required for the operation of PEM fuel cell power systems by the hydrolysis of fuels.

BACKGROUND

Fuel cells are electrochemical energy conversion devices that convert an external source fuel to electrical current. If any fuel cells use hydrogen as the fuel and oxygen (typically from air) as an oxidant. The by-product for such a fuel cell is water, making the fuel cell a very low environmental impact device for generating power. For an increasing number of applications, fuel cells are more efficient than conventional power generation, such as combustion of fossil fuel, as well as portable power storage, such as lithium-ion batteries.

A fuel cell provides a direct current (DC) voltage that can be used for numerous applications including stationary power generation, lighting, back-up power, consumer electronics, personal mobility devices, such as electric bicycles, as well as landscaping equipment and other applications. There are a wide variety of fuel cells available, each using a different chemistry to generate power. Fuel cells are usually classified according to their operating temperature and the type of electrolyte system that they utilize. One common fuel cell is the polymer exchange membrane fuel cell (PEMFC), which uses hydrogen as the fuel and oxygen (usually air) as its oxidant. It has a high power density and a low operating temperature of usually below 80° C. These fuel cells are reliable with modest packaging and system implementation requirements.

In a PEMFC, hydrogen gas is fed to the anode side, ionizes and releases protons as follows:

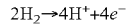

The protons pass through the electrolyte to the cathode side while the electrons are conducted through an external electrical circuit to the cathode side. At the cathode side, oxygen (usually from ambient air) reacts with the electrons and the protons to form water as follows:

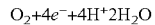

Water produced at the cathode is generally exhausted out to the ambient or condensed and used to cool the PEMFC. The production of water however offers an opportunity to harvest the product water and use some or all of it to generate hydrogen by hydrolysis with chemical hydrides.

The requirement of high purity hydrogen, hydrogen storage and/or generation has limited the wide-scale adoption of PEM fuel cells (PEMFC). Although molecular hydrogen (e.g. compressed hydrogen) has a very high energy density on a mass basis, as a gas at ambient conditions it has very low energy density by volume. The techniques employed to provide hydrogen to portable fuel cell applications are most often focused on chemical compounds that reliably release hydrogen gas on-demand. Three broadly accepted mechanisms used to generate hydrogen from materials are desorption of metal hydrides, hydrolysis of chemical hydrides, and thermolysis of chemical hydrides. A combination of these mechanisms may also be used.

Metal hydrides such as $MgH_2$, $N_aAlH_4$, and $LaNi_5H_6$, can be used to store hydrogen and supply hydrogen on-demand reversibly. However, metal hydride systems often suffer from poor specific energy (i.e., a low hydrogen storage to metal hydride mass ratio) and poor input/output flow characteristics. Hydrogen flow characteristics are driven by the endothermic properties of metal hydrides (the internal temperature drops when removing hydrogen and rises when recharging with hydrogen). Because of these properties, metal hydrides tend to be heavy and require complicated systems to rapidly charge and/or discharge them. For example, commonly owned U.S. Pat. No. 7,271,567 and entitled "FUEL CELL POWER AND MANAGEMENT SYSTEM, AND TECHNIQUE FOR CONTROLLING AND/OR OPERATING SAME," describes a system designed to store and then controllably release pressurized hydrogen gas from a cartridge containing a metal hydride or some other hydrogen-based chemical fuel. This system also monitors the level of remaining hydrogen capable of being delivered to the fuel cell by measuring the temperature and/or the pressure of the metal hydride fuel itself and/or by measuring the current output of the fuel cell to estimate the amount of hydrogen consumed.

Chemical hydrides, such as lithium hydride (LiH), lithium aluminum hydride ($LiAlH_4$), lithium borohydride ($LiBH_4$), sodium hydride (NaH), sodium borohydride ($NaBH_4$), and the like, are used to store hydrogen gas non-reversibly. Chemical hydrides may produce hydrogen upon reaction with water (hydrolysis) as shown below for two exemplary chemical hydrides.

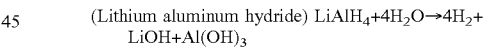

To reliably control the reaction of chemical hydrides with water to release hydrogen gas from a fuel storage device, a catalyst, and additives that control the pH of the water feed may be employed. An inert stabilizer may also be used to inhibit the early release of hydrogen gas from the hydride. A disadvantage of the hydrolysis route is the need for providing a water supply, which adds on to the weight and volume of the fuel cell power system. However, water generated at the cathode may be harvested to supply the water required for the hydrolysis reaction. The harvesting of liquid water without the use of condensers and coolant loops is a challenging problem. In addition, chemical hydrides compositions that are capable of generating hydrogen using near-stoichiometry water requirements may also be required to minimize the need for an external water supply. On the other hand, the use of water vapor offers benefits in the form of better controllability of the hydrolysis reaction and hydrogen release rates. The gradual addition of water as water vapor also helps to avoid pressure spikes, and prevents the occurrence of localized hot spots in the fuel that could lead to thermal decomposition and nm-away reactions.

Traditionally hydrogen producing fuel comprising a chemical hydride and metal hydride have been used. The fuel may be contained within a hydrogen and water vapor permeable, liquid water impermeable membrane. Upon exposure to water vapor, the chemical hydride produces hydrogen, which may in-part be reversibly adsorbed by the metal hydride. The disclosed chemical hydride includes alkali metals, calcium hydride, lithium hydride, lithium aluminum hydride, lithium borohydride, sodium borohydride and combinations thereof. The fuel cell layer may be wrapped around the fuel pellet. In addition, a membrane may be disposed within a container that is responsive to pressure differences between the inside of the power generator and ambient to regulate the generation of hydrogen via valves, which may be integral with the fuel cell layer, or otherwise disposed within container. The power generator may include a fuel chamber within a generator housing that holds the fuel, which may be encapsulated or wrapped in a water impermeable, hydrogen and water vapor permeable material. Reaction of the fuel with water vapor generated from the fuel cell produces hydrogen gas that is used by the fuel cell to generate electricity. The fuel cell layer is intimately integrated with the fuel to enable capture water vapor produced. When the fuel is consumed, the power generator will need to be disposed for recycle or refilling. These passive methods and devices are more suited to support fuel cell power applications that are generally less than IOW (watts). Methods and devices to utilize water vapor generated from a fuel cell that is situated external to the fuel supply to enable replacement of the fuel supply only were not disclosed.

Traditionally a waterless power generator and a passively controlled process for producing electricity with a fuel cell using stoichiometric amounts of a solid hydrogen containing fuel and byproduct water vapor produced by the fuel cell to generate hydrogen gas have been used. The generated hydrogen gas is then consumed in the fuel cell to generate electrical power and water. The process runs without any attached water source or water supply other than the water which is produced by the fuel cell. The disclosed generator and operating methods do not permit use of a standalone disposable hydrogen supply (also known as hydrogen cartridge) that can generate hydrogen using water vapor produced from a fuel cell.

Traditionally a hydrogen generator device that is disposable and not tightly integrated with the PEM fuel cell are known. The hydrogen generator comprised a chemical hydride fuel pellet core which had a plurality of holes extending through the core. A plurality of polymeric tubes formed of water vapor permeable and hydrogen impermeable material were disposed in the holes. Cathode air exhaust containing water vapor was then fed through the tubes. Water vapor selectively permeated through the tubes, reacted with the pellet core, and generated hydrogen, which was routed to the PEM fuel cell. Alternately, wet air exhaust from the PEMFC cathode could be fed to the outer wall of the water permeable tubes that contained the fuel. Hydrogen was produced upon reaction with water vapor and removed from inside the tubes. In either case. the wet air exhaust from the cathode will contain some considerable amounts of oxygen not consumed in the fuel cell because PEM fuel cells are generally run with excess air. Any leakage of oxygen through the water permeable membrane tubes raises the potential of creating an explosive mixture with hydrogen produced from the fuel. Further, reaction byproducts could foul the polymeric tubes and reduce water permeation rates. Finally, when PEM fuel cells are nm at constant air flow rate with variable hydrogen feed rate depending on electrical load, the driving force for water permeation through the tubes would drop at lower electrical loads and would require a more complicated control strategy to perhaps increase the exhaust stream pressure to drive water vapor through the tubes.

New and improved methods and devices for generating power using PEM fuel cell power systems that utilize hydrogen generation by hydrolysis of chemical hydrides, and with minimal water requirement are needed.

DISCLOSURE

Disclosed herein are devices, systems and methods, and aspects thereof, of producing power using a PEM fuel cell power system fed with on demand hydrogen. Aspects of systems and methods include providing fuel pellets in a rotatable reactor containment insert while controlling the addition of pressurized liquid into said containment insert, then rotating at least the reactor during liquid feed to generate hydrogen by the hydrolysis of fuel pellets in the reactor: to provide hydrogen via fluid communication to the anode side of an open cathode PEM fuel cell stack; and, whereby said fuel cell stack generates electricity.

In some instances the liquid contains between 100% and about 80% water by volume. In some instances during operation the feeding liquid step comprises feeding liquid from a fluid container at a first flow rate during start-up of the fuel cell stack and reducing the feed rate to a rate that is below the first flow rate during normal operation of the fuel cell stack. In some instance at least a portion of the liquid is atomized before it reaches the fuel pellets. The atomizer may be an ultrasonic mist generator.

In some instances the fuel comprises lithium aluminum hydride. In some instance the fuel comprises an admixture of lithium aluminum hydride and an additive comprising at least one of $AlCl_3$, $MgCl_2$, $BeCl_2$, $CuCl_2$, LiCl, NaCl, and KCl. In some instances the amount of additive in the admixture is <65 wt.-%.

Disclosed herein are devices systems and methods, and aspects thereof, of producing power using a PEM fuel cell power system fed with on demand hydrogen. Aspects of systems and methods include providing fuel pellets in a rotatable reactor containment insert while controlling the addition of pressurized liquid into said containment insert, then rotating at least the reactor during liquid feed to generate hydrogen by the hydrolysis of fuel pellets in the reactor; turbidity fixtures and/or stirring fixtures on the interior surface of the reactor may be added whereby turbidity of the fuel pellets is increased during rotation of the containment insert as opposed to what occurs with a smooth interior; the system providing hydrogen via fluid communication to the anode side of an open cathode PEM fuel cell stack; and, whereby said fuel cell stack generates electricity.

In some instances the rotation of the containment insert is accomplished via a motor. The fuel pellets may be pressed into predetermined quantities of fuel. In some instances, via pressing, binders and additives may be reduced or eliminated. Preferred size range of pellets is between about 4 mm and about 15 mm in diameter.

Aspects of systems and methods include providing fuel pellets in a rotatable reactor containment insert while controlling the addition of pressurized liquid into said containment insert, then rotating at least the reactor during liquid feed to generate hydrogen by the hydrolysis of fuel pellets in the reactor: to provide hydrogen via fluid communication to the anode side of an open cathode PEM fuel cell stack;

routing hydrogen to the anode side of the fuel cell stack at a rate that is excess of that required by the fuel cell stack for producing power yielding a recirculation hydrogen stream; enriching the recirculation hydrogen exiting the anode with water; and routing the water-enriched recirculation stream to the rotatable reactor. In some instances the enriching further comprises: condensing water from the cathode air exhaust; converting the condensed water to a mist comprising a plurality of water droplets using an atomizer; and entraining the water mist in the recirculation hydrogen stream. In some instances the enriching step comprises splitting the recirculation hydrogen stream into a first recirculation stream and a second recirculation stream using a 3-way valve and routing the first recirculation stream to a humidifier and the second recirculation stream directly to the reactor bypassing a humidifier.

Disclosed herein are devices systems and methods, and aspects thereof, of producing power using a PEM fuel cell power system, the system including an outer housing; a fuel containment insert configured to rotate within the outer housing; a solid fuel inside the reactor of the fuel containment insert; at least one liquid inlet in fluid communication with the containment insert, at least one atomizer in fluid communication with the fluid inlet; at least one hydrogen outlet in fluid communication with the containment insert; wherein at least one of the containment insert and the containment insert and liquid inlet are removable from the outer housing. In some instances the fuel pellets are between about 4 mm and about 15 mm in diameter. A liquid reservoir in fluid communication with the liquid inlet may be added. The liquid reservoir may include an electrical solenoid to open and close liquid flow to the liquid inlet; and, an end cap with an external portion and a plunger portion the plunger portion being driven by a spring configured to pressurize the fluid reservoir.

In some instances the fluid feed may be via a fluid pump in fluid communication with a fluid supply and the fluid inlet.

Disclosed herein are devices systems and methods, and aspects thereof, of producing power using a PEM fuel cell power system, the system including an outer housing; a fuel containment insert configured to rotate within the outer housing; a solid fuel inside the reactor of the fuel containment insert; at least one liquid inlet in fluid communication with the containment insert, at least one atomizer in fluid communication with the fluid inlet, at least one hydrogen outlet in fluid communication with the containment insert; at least one turbidity fixtures and stirring element formed as palt of or affixed to the interior surface of the reactor; and wherein at least one of the containment insert and the containment insert and liquid inlet are removable from the outer housing.

Disclosed herein are devices, systems, and methods, and aspects thereof, of producing power using a PEM fuel cell power system, the system including an outer housing; a fuel containment insert configured to rotate within the outer housing; a solid fuel inside the reactor of the fuel containment insert; at least one liquid inlet in fluid communication with the containment insert; at least one atomizer in fluid communication with the fluid inlet; at least one hydrogen outlet in fluid communication with the containment insert; the containment insert may further include an outer shell and an inner shell which together further contain a perforated core. Said core is configured to hold solid fuel yet allow reaction byproduct produced during hydrolysis of the fuel to collect outside the core in the inner shell by passing through the perforations and the containment insert and liquid inlet are removable from the outer housing.

In some instances the fuel comprises lithium aluminum hydride. In some instances the fuel comprises an admixture of lithium aluminum hydrides with additives that include, but are not limited to $AlCl_3$, $MgCl_2$, $BeCl_2$, $CuCl_2$, LiCl, NaCl, and KCL. The amount of additive in the admixture is between 5 wt.-% and 30 wt.-%.

Disclosed herein are devices, systems, and methods, and aspects thereof, of producing power using a PEM fuel cell power system comprises providing a dosed cathode PEM fuel cell stack comprising a plurality of fuel cells, each cell having an anode side and a cathode side that enables operation of the cathode side at substantially ambient pressure. At start-up, water is fed from a water storage to a rotary bed reactor to generate hydrogen by the hydrolysis of a fuel in the reactor. Hydrogen generated from the reactor is muted to the anode side of the fuel cell stack at a rate that is excess of that required by the fuel cell stack for producing power, and a recirculation hydrogen stream. The recirculation strean1 is enriched with water condensed from the cathode side of the fuel cell stack. The water-enriched recirculation stream is fed to the rotary bed reactor. During nom1al operation, water from the water storage may not be required or may be used to supplement water feed to the reactor. Water is converted to a water mist comprising a plurality of droplets prior to feeding to the rotary bed reactor using an atomizer, preferably an ultrasonic mist generator. The fuel preferably comprises of lithium aluminum hydride or mixtures of lithium aluminum hydride and additives that include, but are not limited to, $AlCl_3$, $MgCl_2$, $BeCl_2$, $CUCl_2$, LiCl, NaCl, and KCL. Water from the cathode side may be fed to a secondary water storage, or may be directly routed to the mist generator. Reactant air to the cathode side may be separately provided to the foe] cell stack, apart from the coolant air to the stack.

Disclosed herein are devices, systems, and methods, and aspects thereof of producing power using a PEM fuel cell power system comprises providing an open cathode PEM fuel cell stack comprising a plurality of fuel cells. The flow at the cathode side exit is restricted to drive water from the cathode side to the anode side. Water is fed from a water storage to a rotary bed reactor to generate hydrogen by the hydrolysis of a fuel in the reactor at start-up. Hydrogen is routed to the anode side of the fuel cell stack at a hydrogen flow rate sufficient for producing power, and a water enriched recirculation hydrogen stream. The recirculation stream may be additionally enriched in water content using water from a water storage. Water from the water storage is preferably converted to mist prior to feeding to the reactor.

Disclosed herein are devices, systems, and methods, and aspects thereof, of producing power using a PEM fuel cell power system comprises providing an open cathode PEM fuel cell stack comprising a plurality of fuel cells feeding water from a water storage to a rotary bed reactor to generate hydrogen by the hydrolysis of a fuel in the reactor; and routing hydrogen to the anode side of the fuel cell stack at a hydrogen flow rate sufficient for producing power. Hydrogen recirculation or water recovery steps are not used. Water is converted to a water mist comprising a plurality of droplets prior to feeding to the rotary bed reactor using an atomizer, preferably an ultrasonic mist generator.

Disclosed herein are devices, systems, and methods, and aspects thereof of a rotary bed reactor for use in the fuel cell power system comprises an outer stationary housing having a water inlet in fluid communication with a water storage, a cylindrical insert that is rotatable disposed within the outer housing and having a plurality of feed openings in fluid communication with the water inlet of the stationary housing and an outlet for removing hydrogen. A fuel, preferably lithium aluminum hydride, calcium hydride, sodium aluminum hydride, sodium hydride, aluminum hydride in the form of particles is provided inside the insert. Hydrogen is generated by the hydrolysis of the fuel with water and removed from the outlet. Water is preferably fed in the form of a water mist to the reactor. The mist may be generated using an atomizer that may be closely coupled to the water inlet. The fuel may also comprise of mixtures of lithium aluminum hydride, calcium hydride, sodium aluminum hydride, sodium hydride, aluminum hydride and additives that include, but are not limited to, $AlCl_3$, $MgCl_2$, $BeCl_2$, $CuCl_2$, LiCl, NaCl, and KCl.

Other features and advantages of the present disclosure will be set forth, in part in the descriptions which follow and the accompanying drawings, wherein the preferred aspects of the present disclosure are described and shown, and in part, will become apparent to those skilled in the art upon examination of the following detailed description taken in conjunction with the accompanying drawings or may be learned by practice of the present disclosure. The advantages of the present disclosure may be realized and attained by means of the instrumentalities and combinations particularly pointed out in the appendant claims.

DRAWINGS

The foregoing aspects and many of the attendant advantages of this disclosure will become more readily appreciated as the same becomes better understood by reference to the following detailed description, when taken in conjunction with the accompanying drawings, wherein.

Figure 8A:
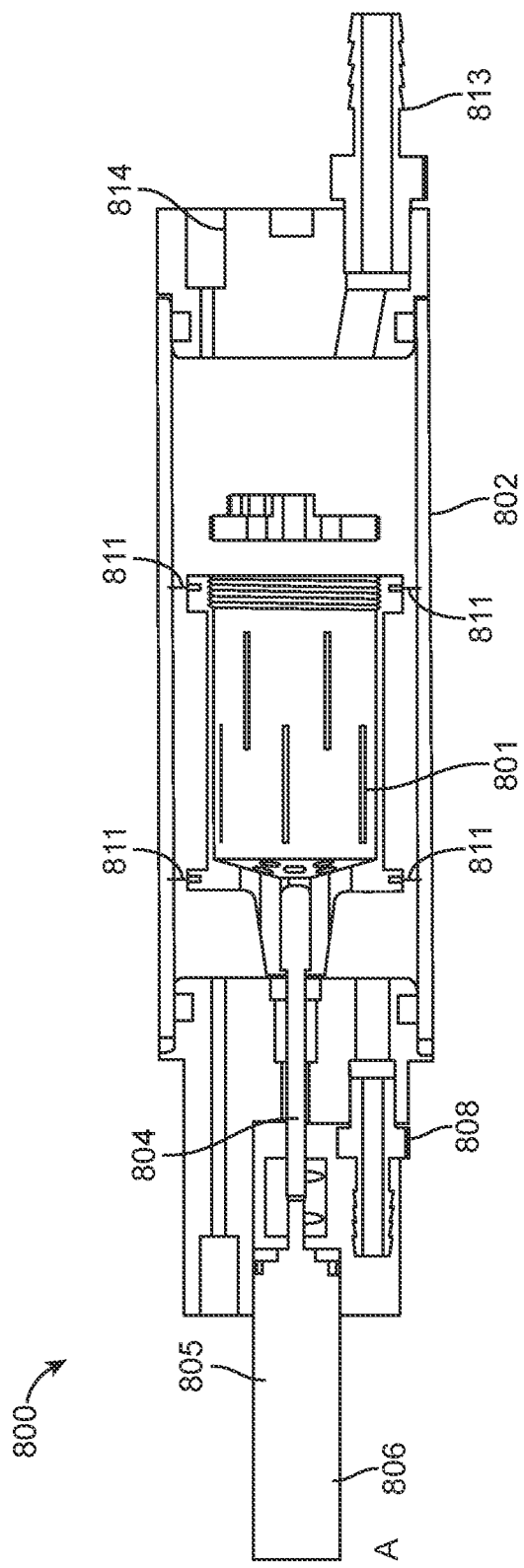
Figure 8B:
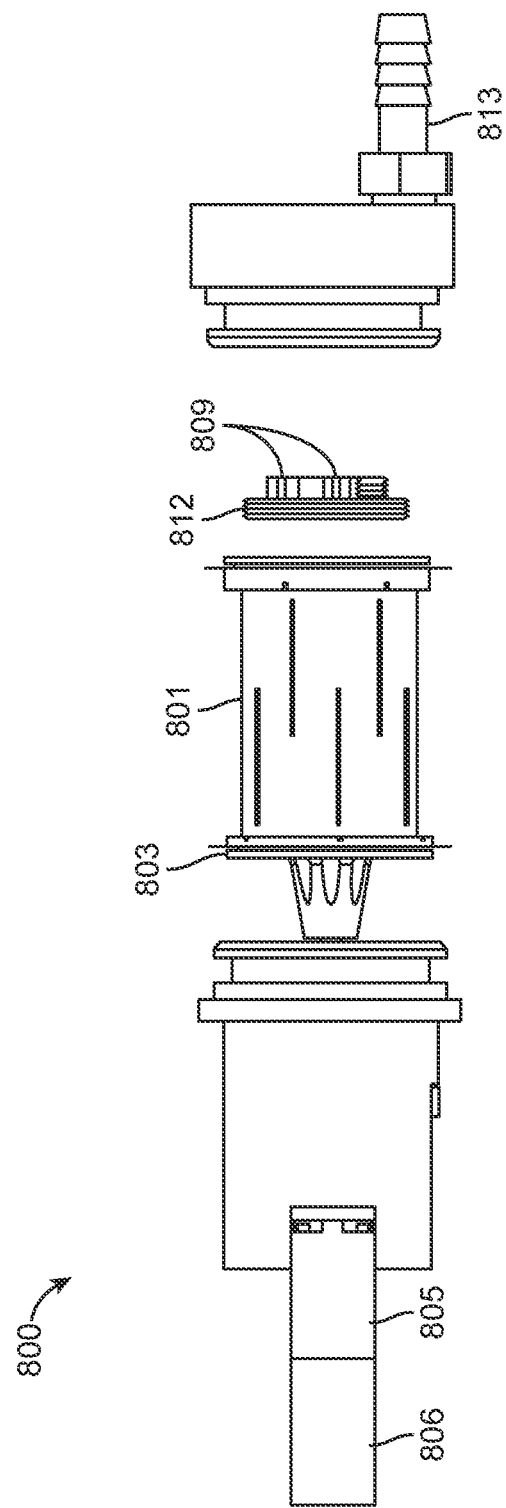
Figure 8C:
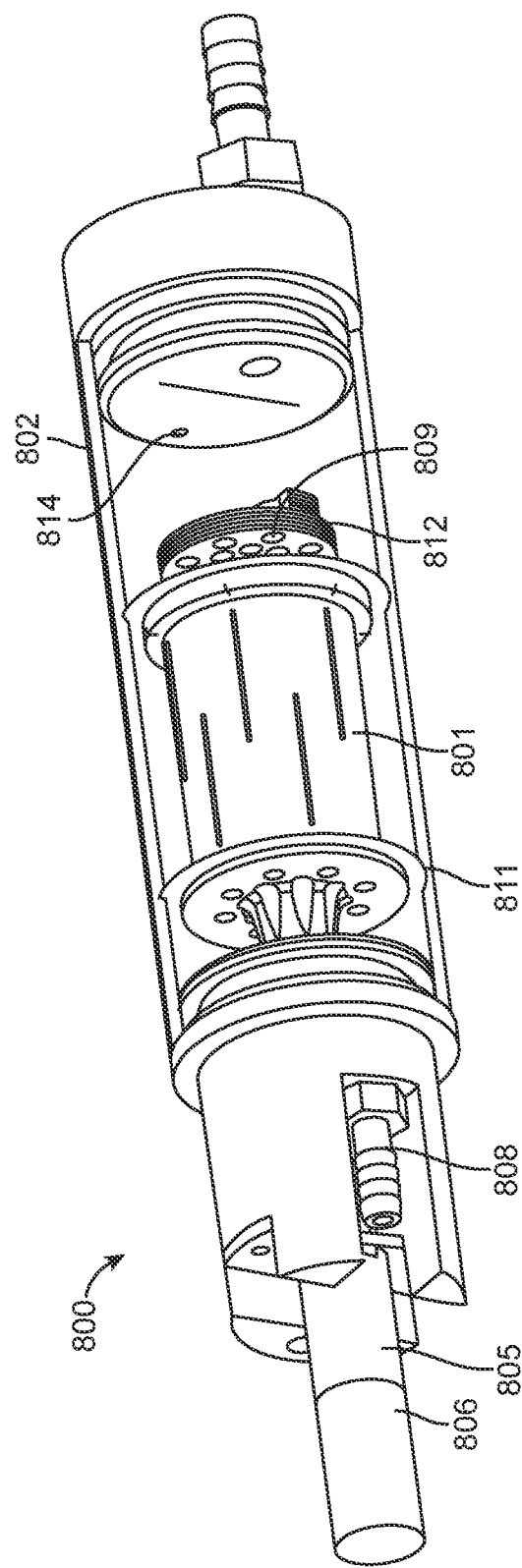

FIG. 8(a) to FIG. 8(c) shows various views of an exemplary rotary bed reactor for use in fuel cell power systems: FIG. 8(a) is cross section view; FIG. 8(b) is an exploded view (outer tube not shown); and FIG. 8(c) is a perspective view with the outer tube cut open.

Figure 9:
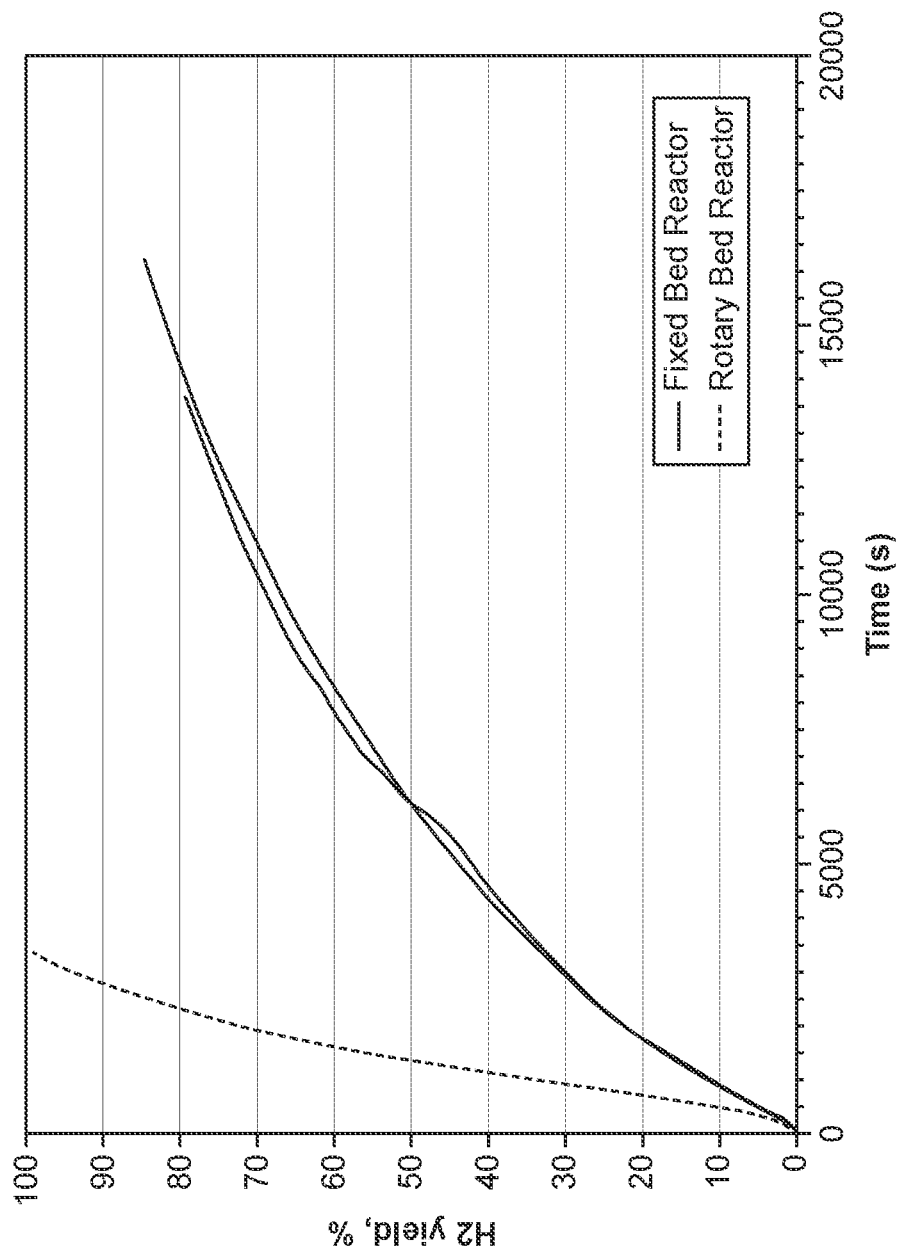

FIG. 9 shows hydrogen yield as a function of time during hydrolysis of lithium aluminum hydride in a both rotary bed and fixed bed reactors.

Figure 10:
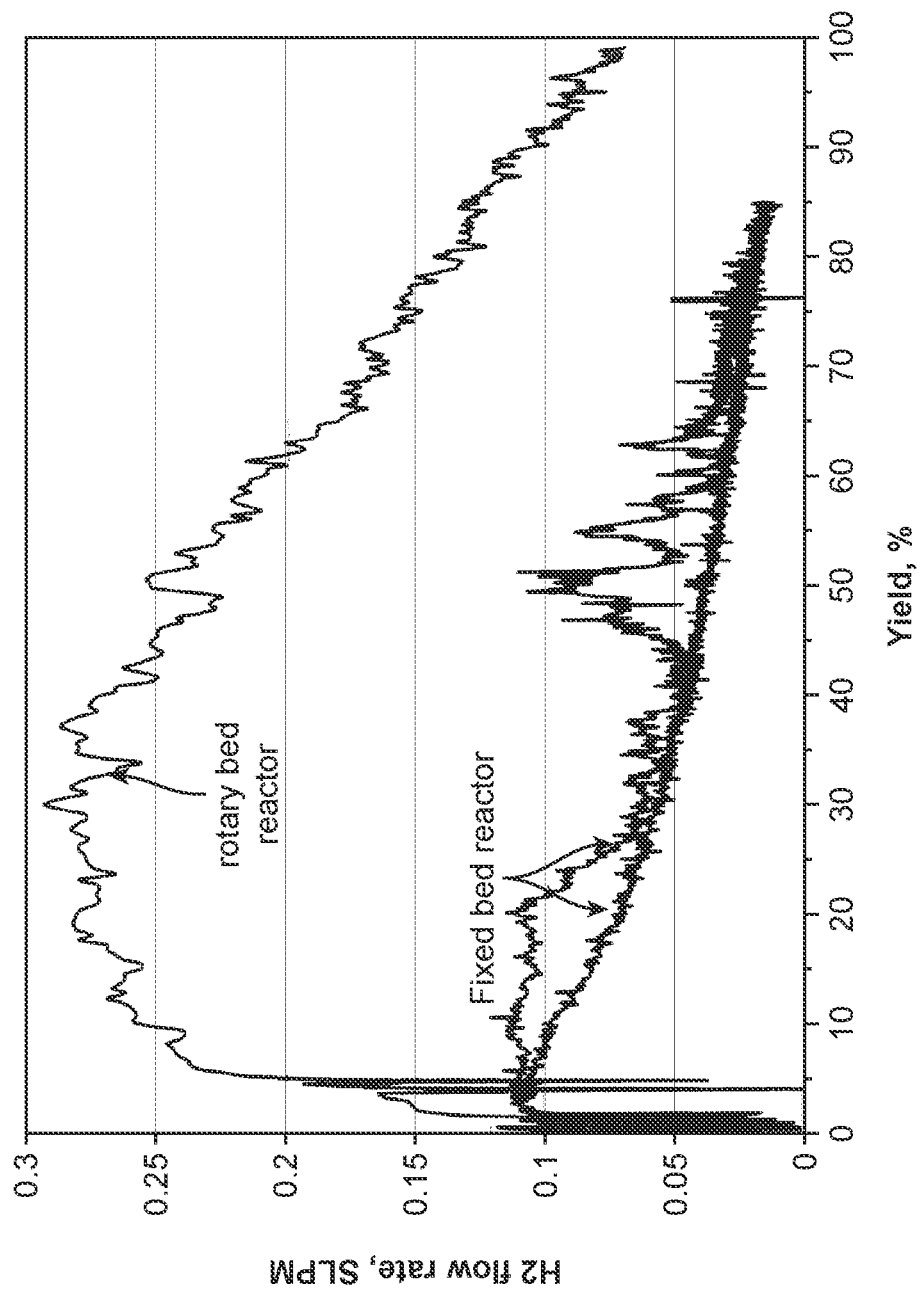

FIG. 10 shows hydrogen flow rate as a function of hydrogen yield during hydrolysis of lithium aluminum hydride in a both rotary bed and fixed bed reactors.

Figure 11:
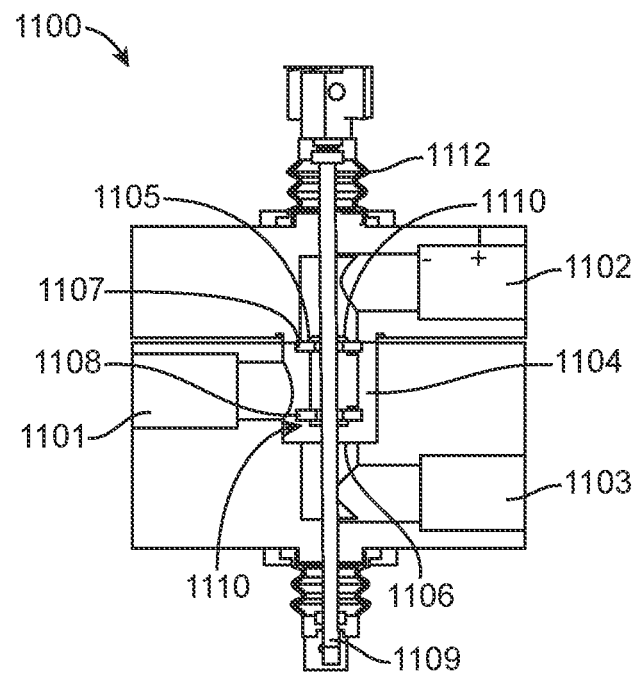
Figure 11:
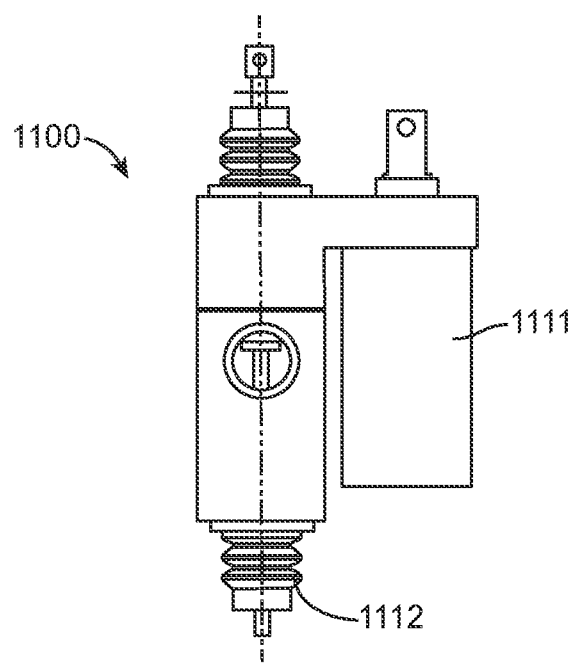

FIG. 11 shows various views of an exemplary 3-way valve for controlling the flow of hydrogen recirculating stream (FIG. 1) to the humidifier.

Figure 12A:
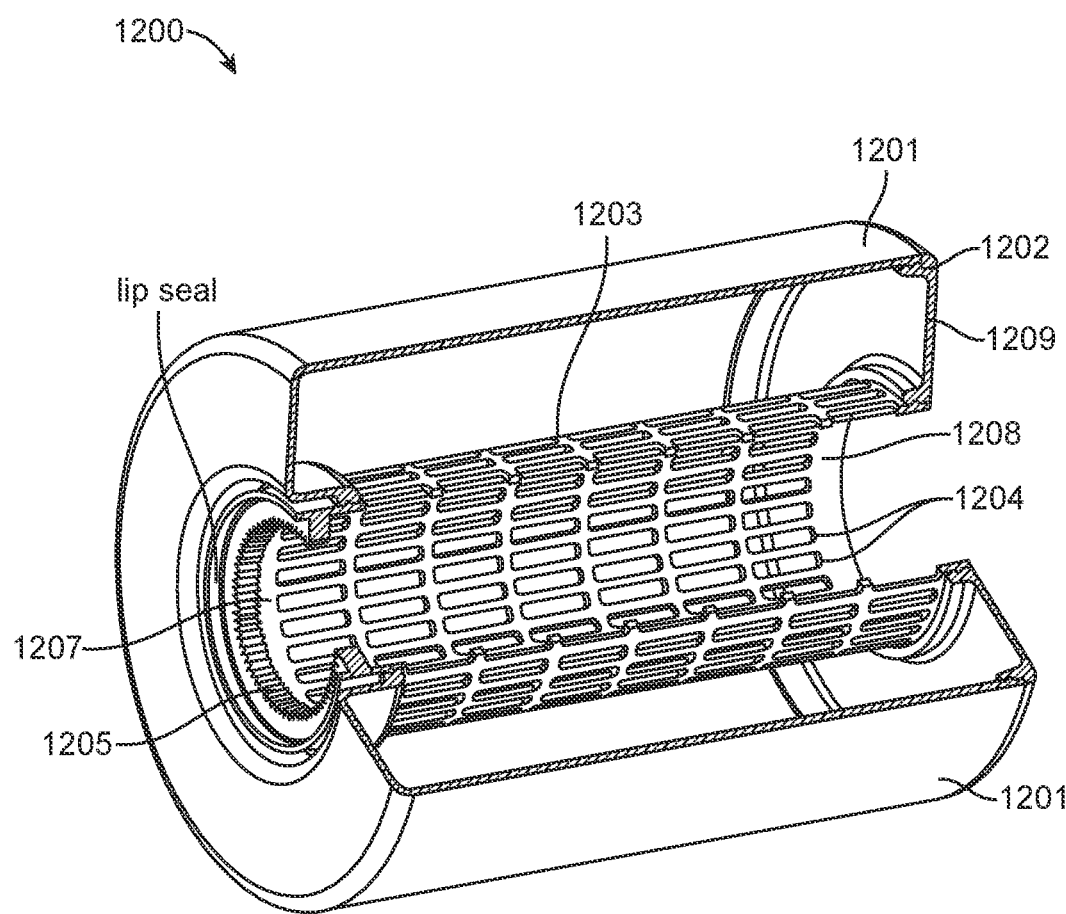
Figure 12B:
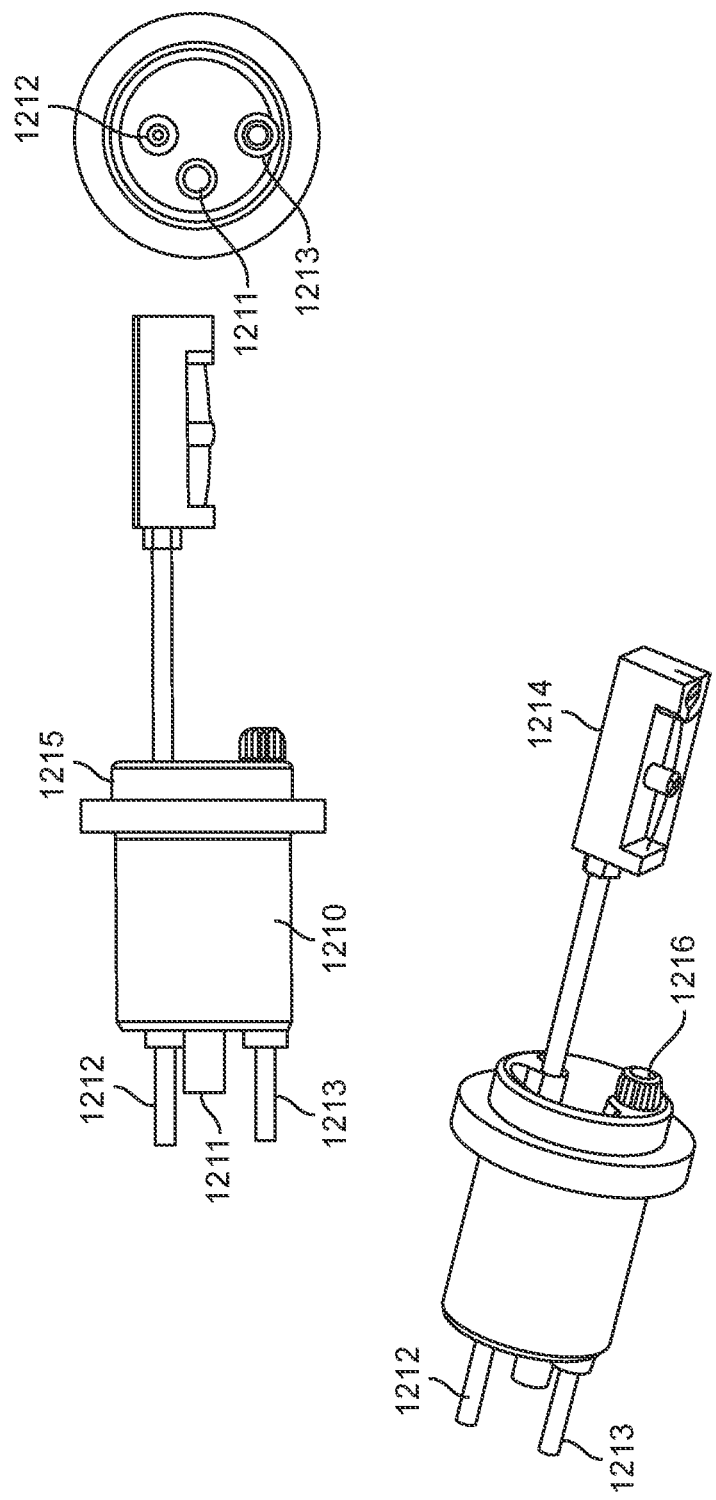

FIG. 12(a) shows a sectional perspective view of an exemplary rotary bed reactor; FIG. 12(b) shows the drive assembly that mates with the rotating parts of the reactor.

Figure 13:
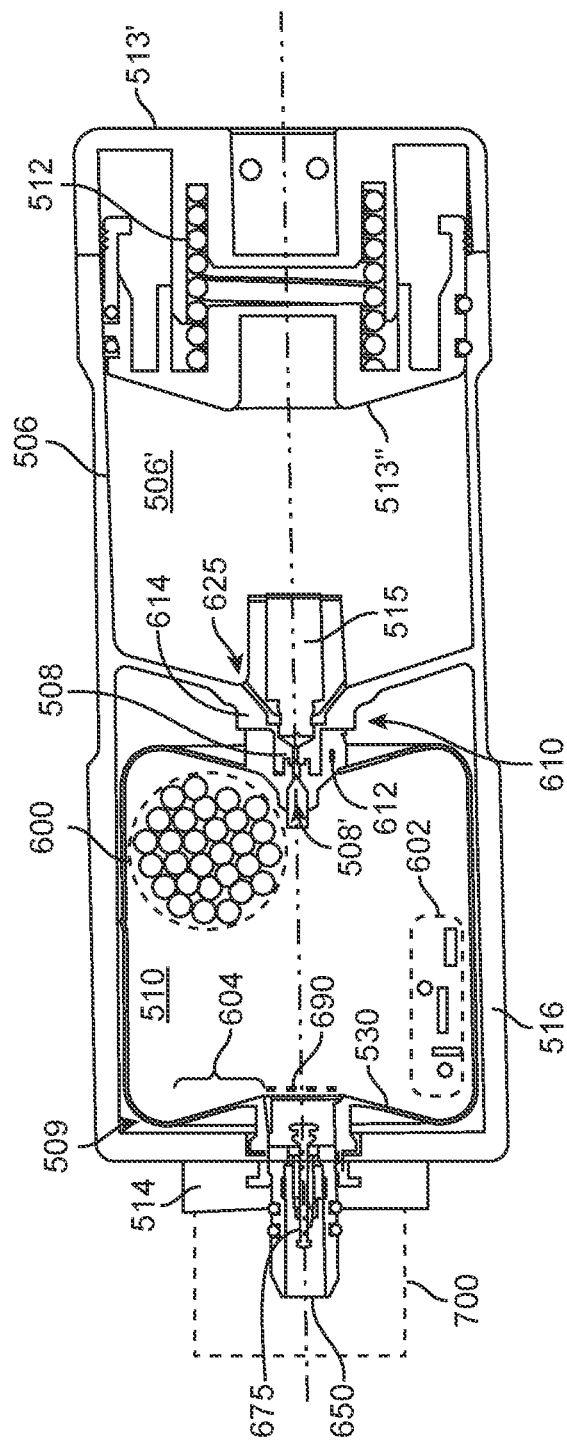

FIG. 13 shows a cut away view of an assembled rotary reactor with pressurized fluid feed.

Figure 14:
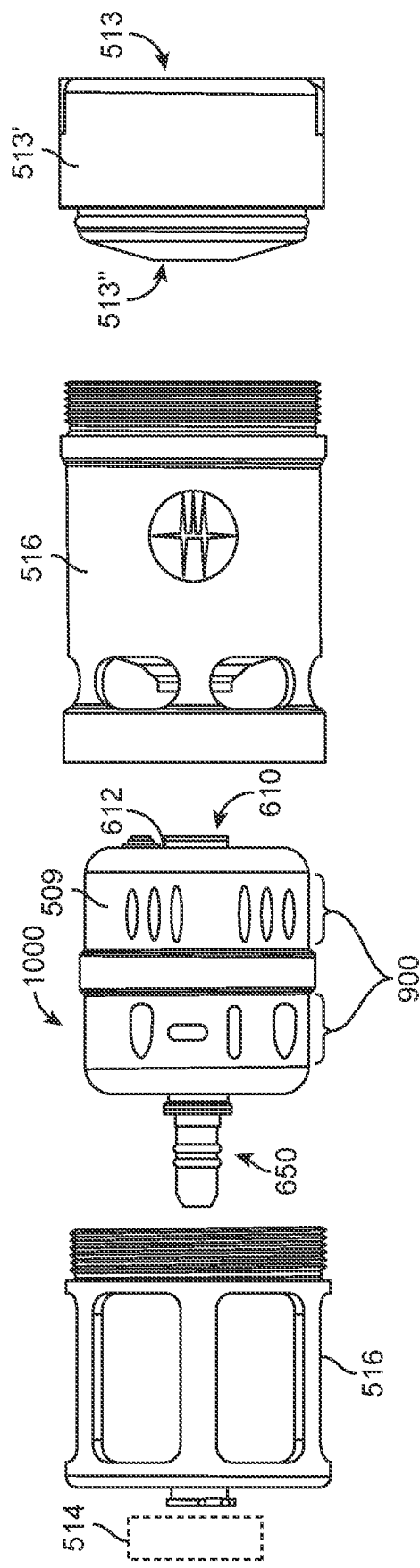

FIG. 14 shows an assembly view of a rotary reactor.

Figure 15:
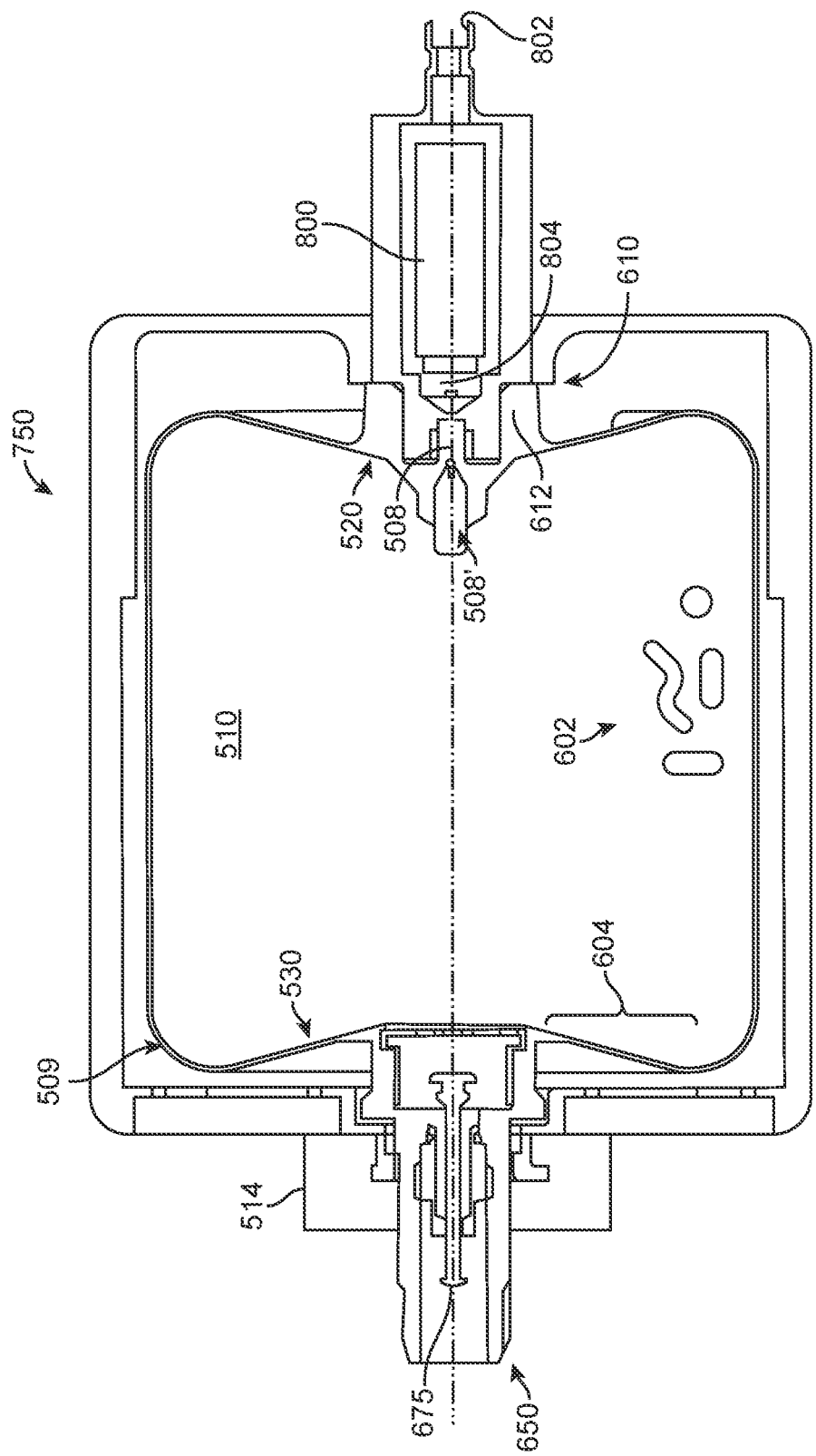

FIG. 15 shows a cut-away view of a rotary reactor and fluid pump configured to attach to a fluid supply.

The components in the figures are not necessarily to scale, emphasis instead being placed upon illustrating the principles of the disclosure. All reference numerals, designators and callouts in the figures and Appendices are hereby incorporated by this reference as if fully set forth herein. The failure to number an element in a figure is not intended to waive any rights. Unnumbered references may also be identified by alpha characters in the figures. All callouts in figures are hereby incorporated by this reference as if fully set forth herein.

The following detailed description includes references to the accompanying drawings, which form a part of the detailed description. The drawings show, by way of illustration, specific embodiments in which the fuel cell systems and methods may be practiced. These embodiments, which are also referred to herein as "examples" or "options," are described in enough detail to enable those skilled in the art to practice the present invention. The embodiments may be combined, other embodiments may be utilized or structural or logical changes may be made without departing from the scope of the invention. The following detailed description is, therefore, not to be taken in a limiting sense and the scope of the invention is defined by the appended claims and their legal equivalents.

In this document, the terms "a" or "an" are used to include one or more than one, and the term "or" is used to refer to a nonexclusive "or" unless otherwise indicated. In addition, it is to be understood that the phraseology or terminology employed herein, and not otherwise defined, is for the purpose of description only and not of limitation.

DETAILED DISCLOSURE

Particular aspects of the disclosure are described below in considerable detail for the purpose for illustrating its principles and operation. However, various modifications may be made, and the scope of the invention is not limited to the exemplary aspects described.

The fuel cell power system schemes described below target methods and devices that lead to efficient and lightweight power systems for applications such as unmanned aerial vehicles. In one aspect 100 (FIG. 1), air is fed to the cathode side of an open cathode PEM fuel cell stack 103 through manifold 102 using a low pressure blower 101. PEM stack 103 is generally an air cooled stack, although in some instances it may be cooled by a coolant. The cathode side of the open cathode fuel cell stack operates substantially at ambient pressure, and generally less than 10 psi. As described above, water is generated at the cathode side of fuel cell stack 103 which humidifies the air as it leaves fuel cell 111 through outlet manifold 104. Humidified air (relative humidity could be as high as 90%) is routed to humidifier 105, exchanges water with the recirculation hydrogen stream from the anode side exhaust, and is vented out. At start-up, water stored in water storage 106 is fed to reactor 109. Preferably, water is fed to an atomizer 108, preferably an ultrasonic mist generator, using pump 107, where water is converted to a fog or mist comprising tiny water droplets 1 micron to 100 micron in diameter, and preferably 10 micron and 15 micron in diameter. The water mist is then fed to reactor (or cartridge) 109 and reacts with fuel contained therein to produce hydrogen by hydrolysis. The fuel may comprise lithium aluminum hydride (LAH) or other chemical hydrides that produce hydrogen by hydrolysis. The dry hydrogen stream is then fed to the anode side of fuel cell stack 103 in excess of the flow rate required to produce the target power from fuel cell 111. Unreacted hydrogen (recirculation hydrogen stream) is routed to humidifier 105 using a recirculation blower 110, where it exchanges water from the humidified air that exits the fuel cell 111. This water enriched recirculation hydrogen stream, then entrains the mist from atomizer 108 and enters reactor 109. During steady state operation, it is expected that the water enriched hydrogen recirculation stream will supply the water required for hydrolysis in reactor 109; that is make-up water from water storage 106 may not be required during normal operation. The start-up reservoir 106 may be built in to reactor 109 with a suitable water delivery mechanism. Reservoir 106 could be made of flexible polymeric materials. In some instances, for example, to support increased hydrogen generation rates required by peak loads, water from water storage 106 may continue to be fed to atomizer 108 during normal operation at a flow rate that is usually below the flow rate used during start-up. While a preferred water atomizer is the ultrasonic mist generator, other options such as a modified fuel injector used in combustion engines may be used. For example, micro spray nozzles that generate a fine spray (e.g. The Lee Company nozzles) may be used.

The fuel cell power system may optionally include a hydrogen storage component (e.g. metal hydride) that may provide hydrogen required for start-up. In this case, water for start-up may not be required. The hydrogen storage component may be recharged with the hydrogen that is produced. The fuel cell power system may also contain a small Li-ion battery for providing power during start-up and for handling peak loads.

Figure 1:
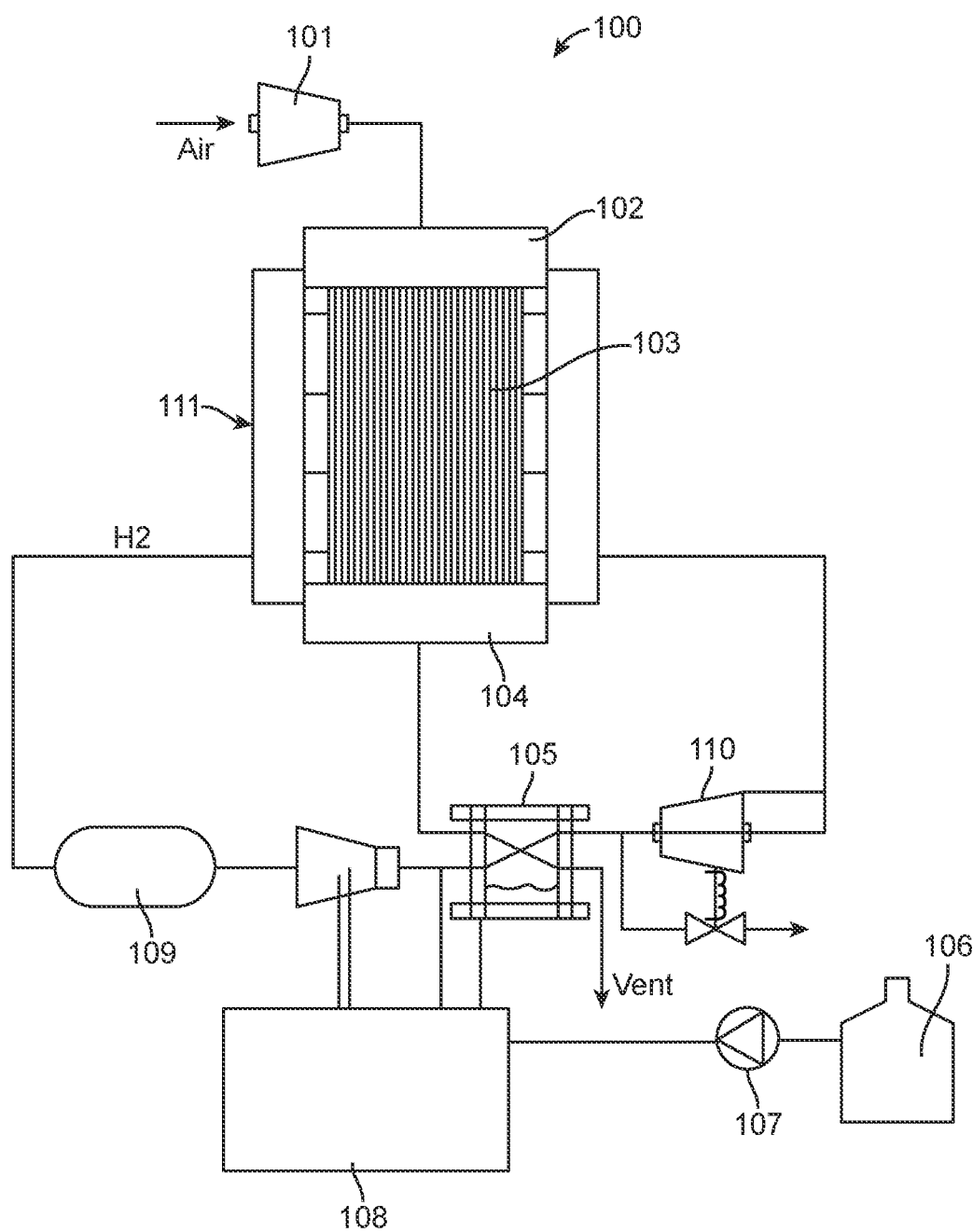
FIG. 1 shows a schematic diagram of an exemplary implementation of an open cathode fuel cell power system with hydrogen recirculation that captures a substantial amount of water required for hydrogen generation.

In the fuel cell system described in FIG. 1, the hydrogen generation rate may be controlled by bypassing the humidifier, in full or in-part, when needed. A 3-way valve may be used for this purpose. A hydrogen generation rate in reactor 109 that exceeds the hydrogen consumption rate in the fuel cell system would likely increase the pressure in reactor 109. A suitable feedback signal may be sent to the 3-way valve, which may respond by routing the recirculation stream away from humidifier 105; that is, in some instances, the recirculating stream would bypass humidifier 105 and be routed directly to reactor 109. This reduces the amount of water fed to the fuel in reactor 109, which in turn would reduce hydrogen production. The 3-way valve may also be designed to split the recirculation hydrogen stream into two streams. The first fraction of the recirculation stream bypasses the humidifier while the second fraction of the recirculation stream flows into the humidifier. This flow splitting may be used to fine-tune the amount of water that enters reactor 109 and could achieve hydrogen control within +/−5 sccm or +/−20 mbar. FIG. 11 shows an exemplary 3-way valve 1100. Valve 1100 comprises a single inlet port 1101 that is in fluid communication with outlet ports 1102 and 1103 through an intermediate fluid chamber 1104. Fluid chamber 1104 comprises valve openings 1105 and 1106 that communicate with the outlets 1102 and 1103 respectively. Valve openings 1105 and 1106 may be closed by sealing disks 1107 and 1108 respectively. The sealing disks are mounted on valve piston 1109 and held in place by a plurality of supporting members 1110. The linear reciprocal motion of piston 1109 urge one of the sealing disks to close a valve opening, while the other disk remains open. The shaft motion may be enabled by a suitable motor ~md crankshaft components or rocking beam or other mechanisms, generally shown as 1111. Bellow type seals 1112 may be used to seal the piston 1109 to the valve body. Instead of using fiat sealing disks that are amenable to switching flow between outlets 1102 and 1103, conical typical sealing disks or other suitable sealing components may be used to partially open openings 1105 and 1106 and route the inlet flow to both outlets 1102 and 1103, thereby facilitating the control of the ex-tent of flow to each outlet in a predetermined manner.

Figure 2:
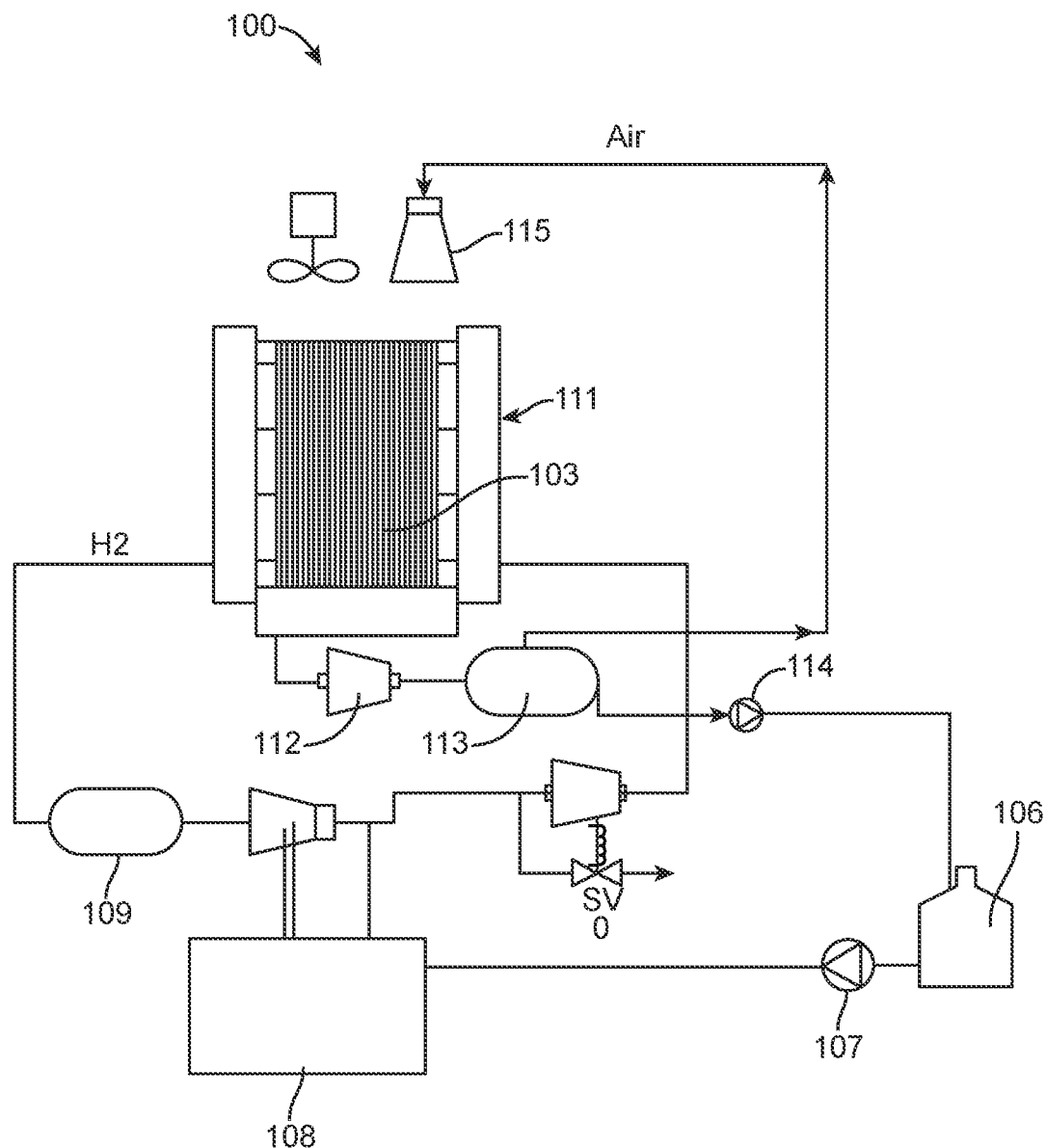
FIG. 2 shows a schematic diagram of an exemplary embodiment of the aspect shown in FIG. 1 that does not use a humidifier.

FIG. 2 shows one embodiment of the first aspect of the fuel cell power system, wherein humidifier 105 is not used. Instead, cathode exhaust is compressed using compressor 112 such that water condenses out without any coolant loops into condenser 113. The exiting air from condenser 113 may be exhausted through an ejector 115 to supplement cooling air if necessary to the fuel cell 111. Alternately, the exiting air from condenser 113 may be vented out. Condensed water from condenser 113 may be routed to water storage 106 using a pump 114. Alternately, condensed water may be fed to atomizer 108 and entrained into reactor 109 by the recirculation hydrogen stream. In some instances, coolant air to the stack is separately provided using a blower, while an air ptm1p may provide reactant air to the cathode side of stack 103.

In a second aspect of the fuel cell power system, water recovery from the fuel cell may be accomplished without the use of a condenser or a humidifier. In the scheme 200 (FIG. 3), PEM fuel cell 211 comprises a dosed cathode stack. The dosed cathode stack operates the cathode side at a pressure above ambient pressure. Closed cathode stack 203 may require the stack coolant air flow to be separate from the reactant air feed to the cathode side of each cell in the stack. Coolant air from blower 201 may be used to pressurize an array of piezoelectric air pumps that are mounted to the inlet air manifold (not shown). Alternately, reactant air may be fed using a diaphragm pump or a centrifugal blower. Since the cathode is closed, the cathode side is pressurized, which encourages the fom1ation of water condensate at the outlet of the cathode or in the cathode manifold 204. The manifold 204 may comprise of condenser components (heat exchanger). Condensed water may be periodically removed using pump 214 and routed to water storage 206. In addition cathode exhaust gas (unreacted oxygen, nitrogen, uncondensed water) may be vented from cathode exhaust manifold 204. At start-up, water stored in water storage 206 is fed to atomizer 208, preferably an ultrasonic mist generator, using pump 207, where the water feed is converted to a fog or mist comprising tiny water droplets 1 micron to 100 micron in diameter, and preferably 10 micron and 15 micron in diameter. The water mist is then fed to reactor (or cartridge) 209 where it reacts with fuel to produce hydrogen by hydrolysis. The fuel may comprise of lithium aluminum hydride (LAH) or other chemical hydrides that produce hydrogen by hydrolysis. The dry hydrogen stream is then fed to the anode side of fuel cell 211 in excess of the flow rate required to produce the target power from fuel cell 211. Alternately, hydrogen exiting reactor 209 may be split into a hydrogen feed stream and a hydrogen recirculation stream. The hydrogen feed stream is fed to the anode side of fuel cell 211 using hydrogen pump or blower 215, and the recirculation stream is routed to reactor 209. When water is fed to atomizer 208, the recirculation hydrogen stream may be used to entrain the water mist into reactor 209. Hydrogen exiting the reactor 209 may be split into a hydrogen feed stream and a hydrogen recirculating stream by throttling the hydrogen recirculating stream using restrictor 216 instead of, or in addition to using pump 215. Any unreacted hydrogen exiting the anode is also recirculated to atomizer 208. During normal operation, it is expected that the condensed water from the cathode side of stack 211 will supply the water required for hydrolysis in reactor 209, that is make-up water from water storage 206 will not be required. The start-up water 206 reservoir may be built in to reactor 209 with a suitable delivery mechanism. Condensed water may also be fed to the inlet of pump 207. Alternately, condensed water may be collected in water storage that is separate of storage 206. Atomizer 208 may be closely coupled to reactor 209 to avoid condensation of the water droplets in the mist.

A single air blower may be used to provide both reactant air and coolant air to fuel cell 211. In this case, active cooling of the water collection components 204 may be required using water from the water storage 206. Uncondensed gases (unreacted oxygen, nitrogen) in the cathode exhaust would have to be vented at a suitable point: for example, from the water storage 206 or a gas/liquid separator such as a flash tank. Use of a closed cathode stack in fuel cell 211 may require a stack purge after change out of reactor 209 using an inert gas.

Figure 3:
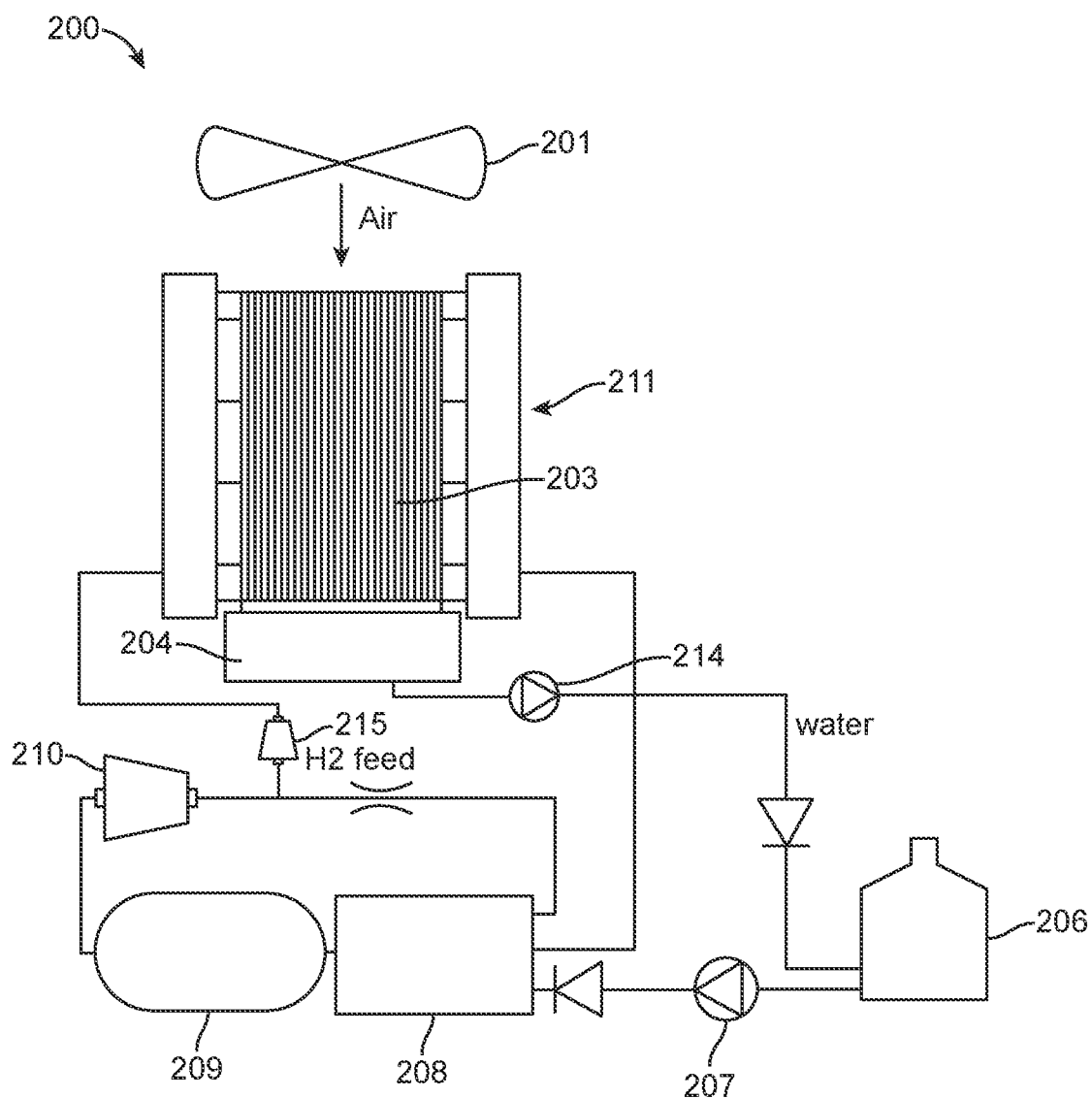
FIG. 3 shows a schematic diagram of an exemplary aspect of a closed cathode fuel cell power system with hydrogen recirculation that captures a substantial amount of water required for hydrogen generation.
Figure 4:
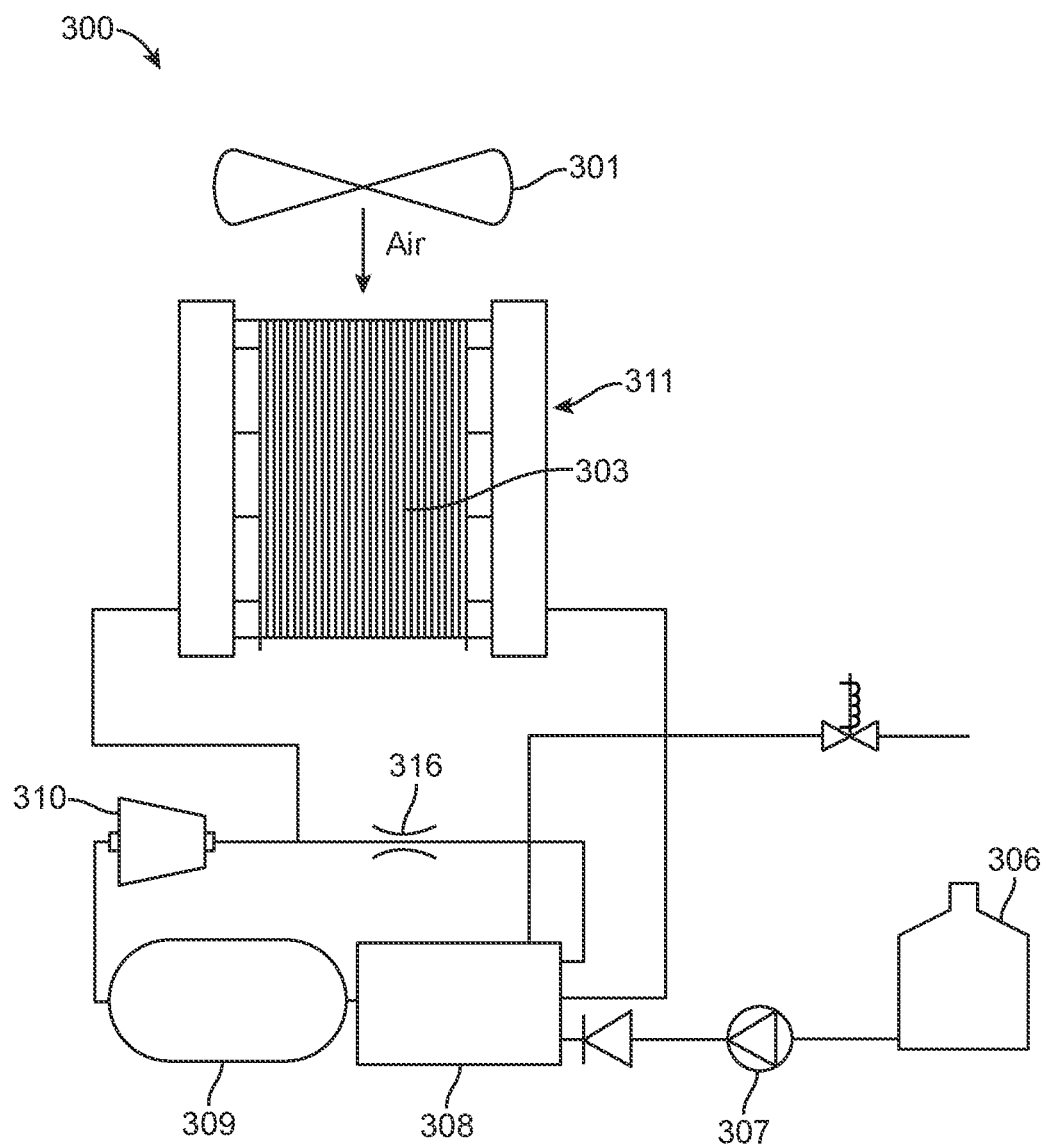
FIG. 4 shows a schematic diagram of another exemplary aspect of a fuel cell power system with hydrogen recirculation that captures a substantial amount of water required for hydrogen generation from the anode side of the fuel cell.

In a third aspect of the fuel cell power system (FIG. 4), the cathode side of stack 303 in fuel cell 311 is restricted to urge water to diffuse to the anode side from the cathode side. Therefore, there is no water recovery from the cathode side. As shown in FIG. 4, air is fed to stack 303 using an air blower 301. At start-up, water from storage 306 is fed to ultrasonic atomizer 308 using pump 307, where the water feed is converted to a fog or mist comprising tiny water droplets 1 micron to 100 micron in diameter, arid preferably 10 micron and 15 micron in diameter. The water mist is then fed to reactor (or cartridge) 309 where it reacts with fuel to produce hydrogen by hydrolysis. The fuel may comprise of lithium aluminum hydride (LAH) or other chemical hydrides that produce hydrogen by hydrolysis. The relatively dry hydrogen gas exiting reactor 309, with relative humidity between 1% and 40%, and preferably between 5% to 15%, at ambient temperature, may be split into a hydrogen feed stream and a hydrogen recirculation stream. Hydrogen exiting the reactor 309 may be split into a hydrogen feed stream and a hydrogen recirculating stream by throttling the hydrogen recirculating stream using restrictor 316; alternately, hydrogen stream splitting may be enabled by using a hydrogen feed pump (as shown in FIG. 3) in lieu of, or in addition to flow restrictor 316. Hydrogen feed to the anode side of fuel cell 311 is preferably in excess of the flow rate required to produce the target power from fuel cell 311 to ensure that some hydrogen exits the anode side. The recirculation hydrogen stream is further enriched in water content when it is routed to atomizer 308 to entrain the water mist into reactor 309. Any unreacted hydrogen exiting the anode is also routed to atomizer 308. During steady state operation, it is expected that the condensed water from the anode side (water is transported to the anode of stack 303 due to the restricted cathode flow design of stack 303) of stack 303 will be carried by the recirculating hydrogen stream to supply the water required for hydrolysis in reactor 309. The start-up 306 reservoir may be built in to reactor 309 with a suitable delivery mechanism. Atomizer 308 may be closely coupled to reactor 309 to avoid condensation of the water droplets in the mist.

The requirements of the target fuel cell power application generally dictates the choice between open cathode fuel cell stack schemes (FIG. 1 to FIG. 2) involving hydrogen recirculation, and closed cathode fuel cell stack schemes (FIG. 3 to FIG. 4). An open cathode stack may be relatively lighter in weight than a closed cathode stack, but generally requires the use of other components such as condensers and humidifiers to capture water, and the additional mass of these components in some circumstances may offset potential weight reduction benefits afforded by the lightweight stacks. On the other hand, dose cathode stack schemes may not generally require external components such as humidifiers and condensers, but are characterized by relatively higher stack mass, and may require a purge step after reactor (cartridge) changeover. Applications that specify near-zero external water requirements (e.g. military applications) may require a close examination of trade-offs between weight reduction and system complexity.

Figure 5:
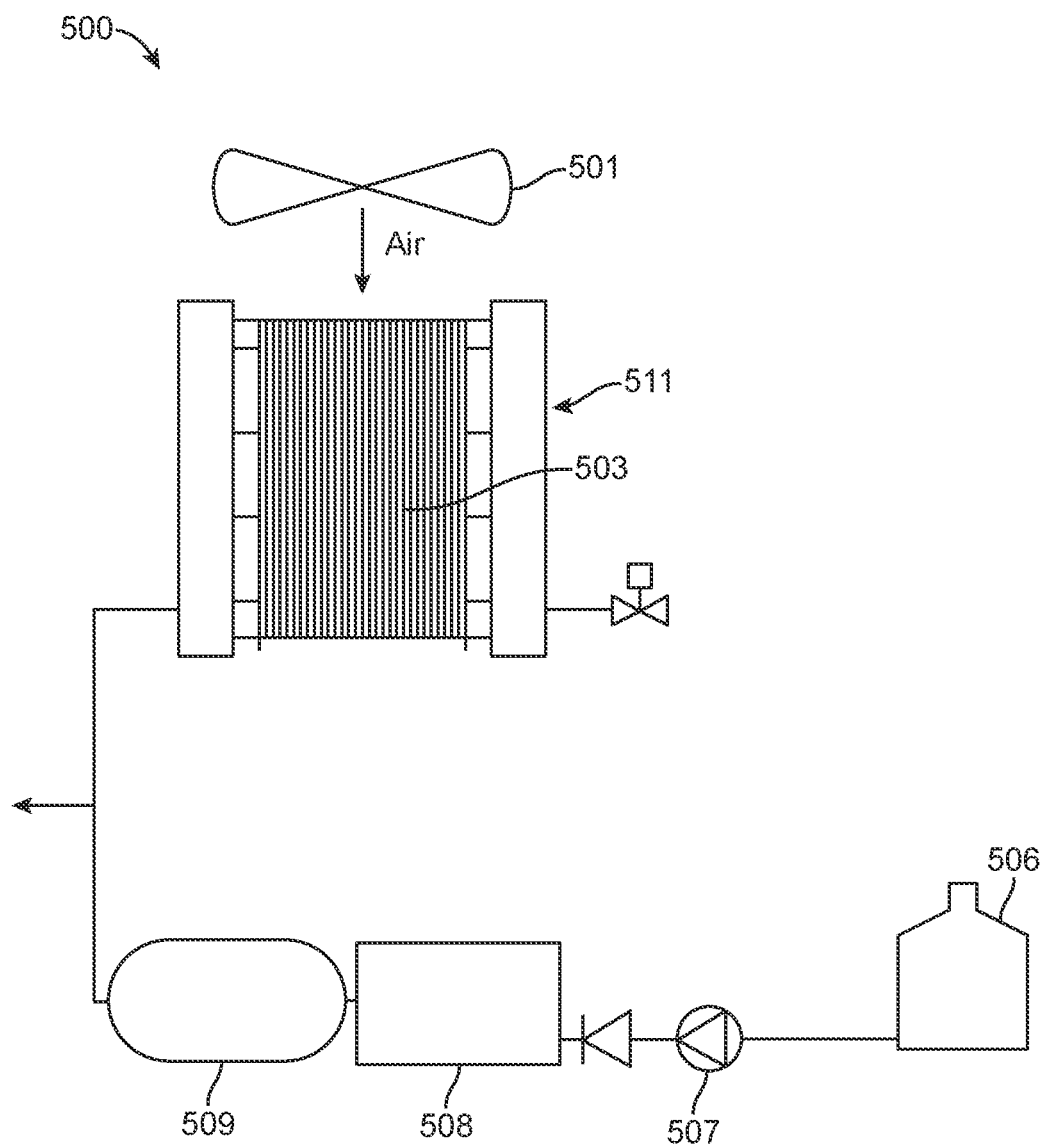
FIG. 5 shows a schematic diagram of an exemplary implementation of an open cathode fuel cell power system without hydrogen recirculation or water recovery.

When applications permit the use of external water, but require a simple and lightweight fuel cell power system, schemes that do not involve hydrogen recirculation may be considered. FIG. 5 illustrates such a fuel cell power system (500), water required for the hydrolysis is contained in fluid storage 506 and is fed to an atomizing fixture 508 such as an atomizer or nozzle using pump 507 or fluid under pressure via spring or other compression producing force. The mist exiting the atomizer 508 is routed to reactor 509 where hydrogen is generated and is fed to the anode side of open cathode fuel cell stack 503 of fuel cell 511. Both cooling and reactant air may be fed to the cathode using blower 501. Atomizer 508 may be removably coupled to reactor 509 to prevent any condensation of droplets from the mist. Condensation may also be minimized or eliminated by the use of electrical heating if needed. As shown in FIG. 5, process scheme 500 does not require liquid recovery from stack 503 or hydrogen recirculation.

In the above aspects and their embodiments, components that include, but are not limited to, liquid feed pump or spring or other mechanism for producing pressurized water, atomizer or atomizing nozzle, micro water control valve, reactor, hydrogen pumps, water storage, and the hydrogen recirculation stream flow restrictor may be interchangeably used. The liquid feed pump could comprise of a miniature piezoelectric pump or other micro pump designs that can output 300 ml/h of water to generate hydrogen from LAH to support a 400 We, 750 We-h fuel cell power system. The parasitic power requirement of the pump is expected to be below 0.5 W. Alternatively, the parasitic loss due to the water pump can be substantially reduced by replacing the water pump with a spring mechanism that pressurizes the water reservoir and, when coupled with a micro water valve, allows water to be controllably dispensed through the atomizing nozzle. The atomizer may be closely coupled to reactor to prevent condensation of water into large droplets. The parasitic power requirement for an ultrasonic atomizer is expected to be less than 5 W. Water storage may be in the form of a flexible bladder that can store 50 g to 300 g of water depending on the requirements of a particular application. The hydrogen recirculation blower is also lightweight (<150 g) with a preferable capacity of at least 50 SLPM at 50 mbar.

Any feasible combination of the concepts described above may be employed to yield a suitable fuel cell power system. For example, in process schemes that use either open cathode or closed cathode stacks without the use of hydrogen recirculation, dry hydrogen exiting the reactor may be humidified by cathode air exhaust (using a suitable humidifier) prior to feeding to the anode side of the stack. Using humidified hydrogen is known to increase the lifetime of air cooled PEM fuel cell stacks.

Figure 6:
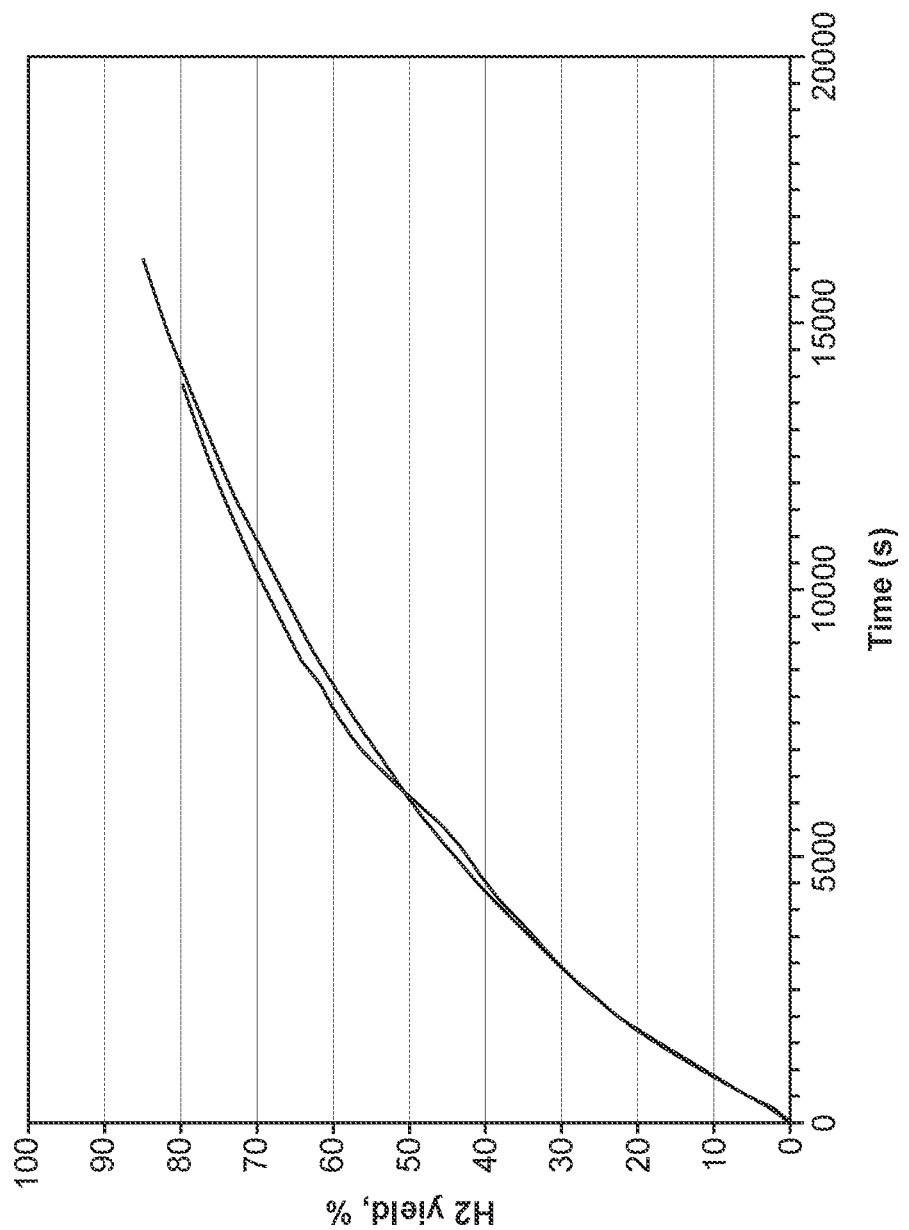
FIG. 6 shows hydrogen yield as a function of time during hydrolysis of lithium aluminum hydride in a fixed bed reactor.
Figure 7:
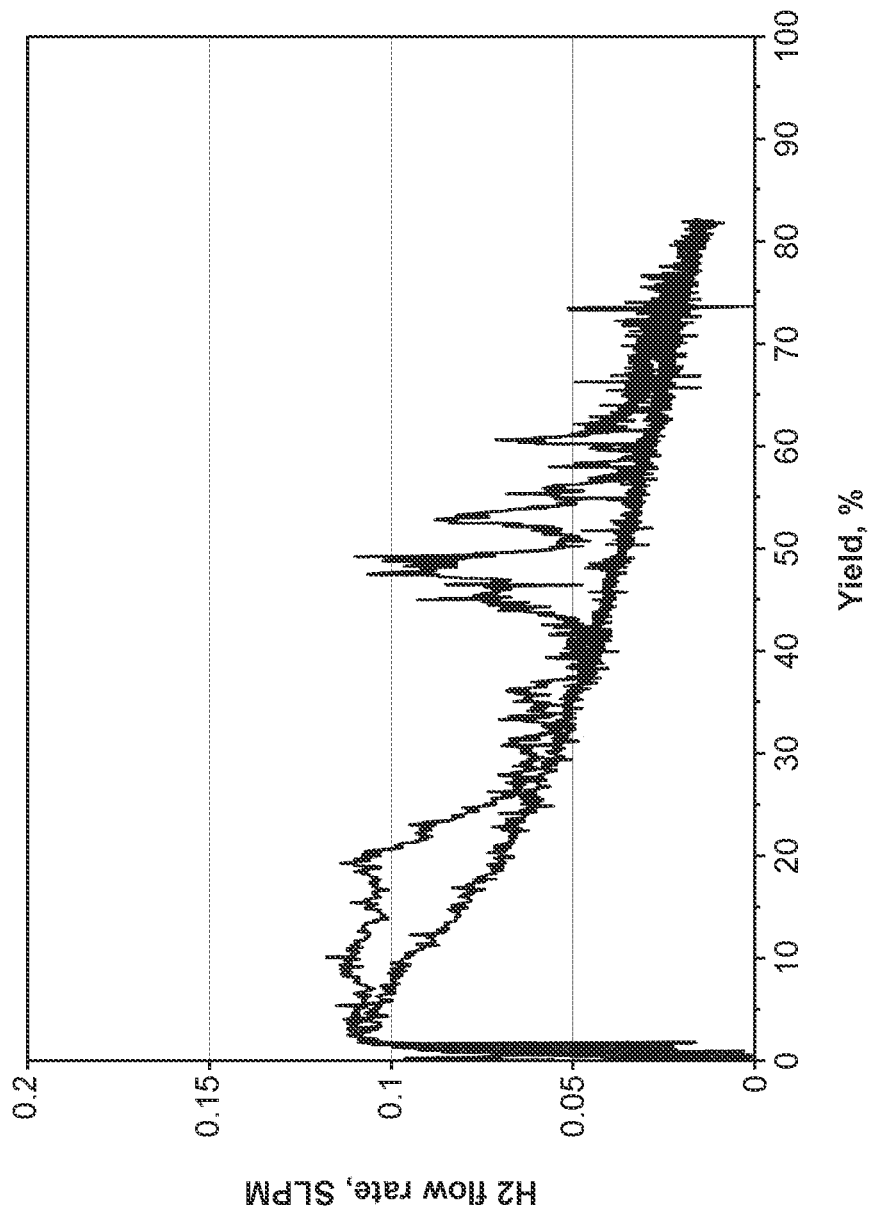
FIG. 7 shows hydrogen flow rate as a function of hydrogen yield during hydrolysis of lithium aluminum hydride in a fixed bed reactor.

The process schemes and fuel cell power systems described above system require hydrogen generation at a sufficient rate in the reactor to support the power output from the fuel cell as well as maintain the recirculation rate required. The inventors observed unsatisfactory hydrogen generation rates and yields during vapor phase hydrolysis in a conventional fixed bed reactor. As shown in FIG. 6, the hydrogen yield flattens out at about 85% at about 3.8 h during vapor phase hydrolysis of LAH in a fixed bed reactor. Hydrogen yield is defined as the amount of hydrogen produced as a fraction the theoretical amount of hydrogen contained in the chemical hydride fuel. The fixed bed comprised of fuel in the form of pellets 4 mm to 15 mm in size. Fluid such as water or water containing fluid is fed in the form of mist using an ultrasonic humidifier. Nozzles that provide a fine mist spray may also be used. Further as shown in FIG. 7, a constant hydrogen flow rate of 0.11 SLPM was measured at yields <25%), after which a reduction in the flow rate was observed. Without intending to be bound by any particular theory, it is believed that the hydrogen generation degrades as the fuel is utilized partially due to the accumulation of reaction byproducts in the reactor, and in particular on the unreacted fuel particles. When this occurs the reactivity of the unreacted fuel particles is significantly reduced, and hydrogen production rate is subsequently significantly reduced. Reaction products that form early on in the life of a fuel charge to the reactor (hydrogen cartridge) essentially block the underlying fresh fuel material. Recirculating humidified hydrogen may further humidify the byproducts such as lithium hydroxide (LiOH), lithium chloride (LiCl), and lithium aluminum hydroxide, $LiA_2(OH)_7$, which further reduces the amount of water that is available to react with fresh fuel. To offset this reduction in hydrogen generation rate throughout the life of the fuel in the hydrogen generator, excess fuel is generally required, which adds on the mass of the hydrogen generator. Excess fuel mass also increases the cost of the hydrogen generator. Conventional fixed bed reactor designs are therefore not suitable for vapor phase hydrolysis. Other novel reactor designs are required to maintain sufficiently steady hydrogen generation rates throughout the life of the fuel.

A reactor that is suitable for use in the above described process schemes is a rotary bed reactor or rotatable reactor. An exemplary rotary bed reactor 800, as shown in FIG. 8(a) to FIG. 8(c), comprises a cylindrical reactor insert 801 that is configured to be rotated in an outer tube 802. End 803 of insert 801 is configured to couple to one end of rotor shaft 804, and is rotated by connecting to a gear train 805 and brushless motor 806. Water is fed to water inlet 808, which is in fluid communication with a plurality of water inlet holes 808 in end 803. Water is preferably fed as a mist or vapor, although liquid water may also be used. Hydrogen generated is removed through outlet 809 disposed in outlet lid 812, and through a corresponding outlet 813 m tube 802 (not shown). Outlet line 812 can be removed connected to insert 801, for example, can be screwed into insert 801. The walls of insert 801 comprise a plurality of slits 810 to allow for preferential removal of reaction byproducts from inside the insert that is urged by the rotary movement of insert 801. Fuel (e.g. LAH or CaH) in the form of pellets or tablets is loosely packed inside insert 801, which reacts with water to generate hydrogen. The rotary movement of the insert keeps the fuel particles in continuous motion and prevents the accumulation of byproducts on the unreacted fuel. Since outer tube 802 is stationary, rotary bed reactor 800 may be operated in any orientation, although operation in the horizontal orientation is preferred. Insert 801 also has a plurality of plastic piston ring seals 811 that seal the insert 801 to the inner wall of outer tube 802, and prevents water mist feed from bypassing the fuel particles inside insert 801. Ports 808 and outlet 813 can be interchangeably used; for example, port 808 may be used as the outlet for hydrogen and 813 as the inlet for the water feed (mist). Suitable filters may be used downstream of outlets, fix example downstream1 of 809 when port 808 is used as the inlet, to prevent particles from clogging the hydrogen outlet. Temperature sensor 814 may be used to monitor the temperature of reactor 800. For an approximately 400 We, 750 We-h fuel cell system, insert 801 is preferably 3 inch to 5 inch in length and 3 inch to 5 inch in diameter. The amount of LAH fuel required would be about 300 g.

Table 1 shows the forecasted specific energy and specific power using an open cathode fuel cell power system nm without hydrogen recirculation or water recovery. A rotary bed reactor is used. The specific energy of about 550 We-h/kg is >2× better than Li-ion batteries. The specific power of about 290 W-e/kg is >5× better than that disclosed in U.S. Pat. No. 9,005,572 for a 33 We fuel cell power system.

TABLE 1

| Metric | Value |
| --- | --- |
| Energy (W-h) | 750 |
| Power (W) | 400 |
| Fuel Cell stack (g) | 250 |
| Power/control electronics (g) | 60 |
| Li-ion battery (g) | 120 |
| Fluidic circuitry (g) | 10 |
| LAH Fuel Cartridge (g) | 450 |
| Case (g) | 80 |
| Total (g) | 1370 |
| Specific Energy (Wh/kg) | 547 |
| Specific Power (W/kg) | 292 |

FIG. 9 shows the drastic improvement in hydrogen yields compared to that measured using the fixed bed reactor. As can be seen, 99% yield was achieved in <1 h of run time. Further, as shown in FIG. 10, >2× increase in hydrogen flow rates were measured at hydrogen yields of up to 50%. These results demonstrate that hydrolysis of LAH in the rotary bed reactor results in faster hydrogen generation rates and improved fuel utilization than the fixed bed reactor. Therefore, the amount of fuel required to support power production in a fuel cell system is reduced, which in turn would increase the specific energy (W-h/kg) and energy density (W/kg) of the fuel cell system.

FIG. 12(a) illustrates another exemplary rotary bed reactor 1200. The reactor comprises concentric shells 1201 and 1202. Outer shell 1201 may be made of aluminum and is stationary. Inner shell 1202 may be made of injected molded plastic that includes PEEK and ULTEM and is configured to be tumbled or rotated. Shell 1202 is configured to receive a perforated cylindrical core 1203 that has a plurality of slits or perforations 1204 on its 'wall.

Perforated core is configured to engage with d liven gear 1205 and may preferably rotate (along with shell 1202) at 2 rpm to 25 rpm. Perforated core 1203 may be made of injected molded plastic that includes PEEK and ULTEM and has first end 1207 and a second end 1208 opposite to the first end. End 1208 may be closed using a plastic end cap 1209. Fuel (e.g. LAH) particles are disposed in the region 1206 between shell 1202 and perforated core 1203. Assembly 1210 shown in FIG. 12(*b*) has a sealing surface 1215 that is configured to from a lip seal with a mating surface in reactor 1200 as shown in FIG. 12(*a*). Assembly 1210 comprises a water inlet port 1212, a hydrogen exit port 1211 and a shaft 1213 that mechanically connects drive gear 1216 to a suitable motor. Filter materials may be housed inside assembly 1210 upstream of hydrogen port 1211 to filter and remove any dust, or other contaminants from hydrogen gas. The water inlet port 1212 is in fluid communication with a spray nozzle (or a plurality of nozzles) 1214. Drive gear 1216 engages with driven gear 1205 and when the motor is energized, tumbles core 1203 and inner shell 1202. The water atomizing nozzle sprays water through the perforations 1204 to contact the fuel particles in region 1206. The slow tumbling movement of shell 1203 helps to expose the fuel particles to water droplets or mist in a substantially uniform manner. In addition, build-up of reaction byproducts on the unreacted fuel particles is minimized or substantially eliminated.

As described above, water mists may be generated using an atomizer. It has been found that using water in the form of a mist (dispersed water droplets) increases the hydrogen generation rate compared to water vapor. When water is in the form of a mist, the water droplets increases the actual mass of water per unit volume entering the reactor. Compared to humidified recirculating hydrogen that contains water vapor, the use of water mist increases the rate of hydrogen generation and fuel utilization. Devices such as fuel injector for combustion engines may also be modified and used to atomize water and generate the water spray or mist. Strictly controlling the mist output rates would avoid issues such as start/stop outgassing or pressure spikes commonly seen when feeding liquid water.

FIGS. 13 and 14 illustrate another exemplary rotary reactor for generating hydrogen when applications pem1it the use of supplied or external water. The system includes a containment insert 1000 comprising at least a rotatable fuel reactor 509 with an interior surface 510 having distal end 530 adjacent to a hydrogen output connection 650 and a proximal end 520 adjacent the reactor fluid input 508', an output connection 650 and an mating guide 612 which forms a fluid interface 610 between the containment insert 1000 and a fluid container 506 via the cooperating mating guide 614 on the fluid container. The rotatable fuel reactor 509 may be generally an annular walled or cylindrical form with a homogeneous or non-homogenous interior surface 510. The interior surface may have turbidity fixtures 602 formed thereon. Such turbidity fixtures may be in the form of raised or lowered texture regions, protrusions, depressions, bumps or divots in a regular or irregular pattern which vary the interior surface and promote turbidity of the pellets during rotation. An extended partial wall or other stirring element 604 may be added to at least one of the proximal and distal ends 520/530. The reactor may be formed of light weight thin walled metals or polymers or insulators which contain fuel which may be in the form of pressed pellets 600 between about 4 mm to 15 mm in size. Thin walled materials, in some instances have less thermal mass then thicker material and will cool faster. Insulators limit some heat transfer.

The fluid container 506 with an interior surface 506' is also provided. The rotatable fuel reactor 509 and fluid container 506 connect via the mating guide 612 and the cooperating mating guide 614 at a fluid interface 610. The connection provides for controlled fluid delivery to the containment insert 1000 and disassociation of at least one of the fluid container and the containment insert 1000 from the system. The disassociation includes removal and replacement. The fluid container 506 may be reversibly sealed via a cap 513. The fluid container maybe refillable. Fluid is kept at pressure above ambient pressure preferably between 5-50 psi to maintain adequate fluid pressure for atomization of the fluid through the atomizing nozzle 508. Fluid can be kept at pressure by various mechanisms including external pump or via integration of a spring 512 and cap 513. The spring 512 provides a force by which the interior portion of the end cap acts as a plunger to exert pressure on the fluid in the fluid container. Fuel reactor 509 is rotated by motor 514. Fluid injection rate through the atomizer 508 may be controlled via a solenoid valve 515 that is actuated and may be controlled via a microprocessor or controller. A fluid input 625 provides a fluid connection via the solenoid valve to the atomizer 508. Fluid in the form of mist exit at the reactor fluid input 508' when the fluid entering the atomizer is pressurized. Those of ordinary skill in the art will recognize that a plentitude of controllers exist in the art and the invention scope is not limited to one particular control scheme. The control may be deployed based on at least one of fluid pressure, hydrogen pressure, hydrogen flow, temperature. time, hydrogen output, voltage or other measured system paran1eter(s). Optionally, a removable lightweight protective outer shell 516 may be added. To reduce cost, all components can be reusable and/or refillable. The rotating mechanism such as a motor or motor and gear system 514 is configured to rotate the reactor while leaving the hydrogen output connection 650 free to connect a fuel cell 700 or other hydrogen using or storing device. Between the output connection 650 and the inside of the reactor 509' is a filter 690 to prevent fine particles from being passed into the H2 output stream. A control valve 675 may be added to at least one of relive pressure in an over pressurized system or to prevent backflow when hydrogen production is halted. Fluid may be between 100% and about 80% water by volume. In some instances heat exchange fixtures such as fins 900 are added to, or formed as part of, the fuel reactor 509. In some instance the heat exchange fixtures 900 may form a part of the turbidity fixtures. In some instances extended fins 900 from the exterior of the reactor coincide with raised or lowered regions on the interior of the reactor.

Turbidity fixtures may be sized and/or positioned to enhance dispersion of fuel pellets during hydrolysis. By sizing and spacing the turbidity fixtures to correspond to the fuel pellet size and shape greater exposure of fluid to fuel is achieved and spent fuel which may crust onto the pellet is dislodged thereby exposing fuel. A system which matches fuel pellet morphology and turbidity fixtures may improve energy density.

FIG. 15 illustrates an assembly 750 utilizing a fluid pump 750 in fluid connection with the containment insert 1000 to deliver pressurized fluid to the atomizer 508. The solenoid illustrated in FIG. 13 is replaced with the pump 800. The pump has an input 802 and output 804 whereby the output is configured to supply fluid to the atomizer 508. The rotating reactor is configured to rotate at the fluid interface 610.

Suitable fuels for use in the rotary bed reactor as described in this disclosure include lithium aluminum hydride (LAH), with purity of at least 95%. The fuel is preferably formulated in the form of particles or tablets. If needed, certain additive materials such as activation agents or catalysts may be added to LAH to maximize hydrogen production from the fuel. Exemplary fuels and materials include, but are not limited to, those disclosed in commonly owned U.S. Pat. No. 8,636,961, and entitled "FUELS FOR HYDROGEN GENERATING CARTRIDGES." which is incorporated by reference herein in its entirety. Exemplary fuels and materials may also include, but are not limited to those disclosed in, U.S. Pat. No. 7,393,369, entitled "APPARATUS, SYSTEM, AND METHOD FOR GENERATING HYDROGEN," U.S. Pat. No. 7,438,732, entitled "HYDROGEN GENERATOR CARTRIDGE," and U.S. Pat. No. 8,357,213, entitled "APPARATUS, SYSTEM, AND METHOD FOR PROMOTING A SUBSTANTIALLY COMPLETE REACTION OF AN ANHYDROUS HYDRIDE REACTANT," which are all incorporated by reference herein in their entirety. Preferable additives include chloride salts that include, but are not limited to, $AlCl_3$, $MgCl_2$, $BeCl_2$, $CuCl_2$, LiCl, NaCl, and KCl. The amount of these additives in the fuel could be up to 65 wt.-%. Preferably, the amount of these additives in the fuel is between about 5 wt.-% and about 30 wt.-%. A preferred alternative is to use LAH without any additives and to use preferred reactor designs such as the rotary bed reactor as described above. Other fuel candidates include sodium aluminum hydride, sodium borohydride, and sodium silicide.

Air cooled stacks and methods of operation of the stacks are described in commonly owned U.S. Pat. No. 8,263,277 entitled "REHYDRATION OF FUEL CELLS," and U.S. Pat. No. 8,323,846 entitled "FUEL CELL GAS DISTRIBUTION," which are incorporated by reference herein in their entirety.

The Abstract is provided to comply with 37 C.F.R. § 1.72(b), to allow the reader to determine quickly from a cursory inspection the nature and gist of the technical disclosure. It should not be used to interpret or limit the scope or meaning of the claims.

Although the present disclosure has been described in connection with the preferred form of practicing it, those of ordinary skill in the art will understand that many modifications can be made thereto without departing from the spirit of the present disclosure. Accordingly, it is not intended that the scope of the disclosure in any way be limited by the above description.

While the methods and fuel cell power systems have been described in terms of what are presently considered to be the most practical and preferred implementations, it is to be understood that the disclosure need not be limited to the disclosed implementations. It is intended to cover various modifications and similar arrangements included within the spirit and scope of the claims, the scope of which should be accorded the broadest interpretation so as to encompass all such modifications and similar structures. The present disclosure includes any and all implementations of the following claims.

It should also be understood that a variety of changes may be made without departing from the essence of the disclosure. Such changes are also implicitly included in the description. They still fall within the scope of this disclosure. It should be understood that this disclosure is intended to yield a patent covering numerous aspects of the disclosure both independently and as an overall system and in both method and apparatus modes.

Further, each of the various elements of the disclosure and claims may also be achieved in a variety of manners. This disclosure should be understood to encompass each such variation, be it a variation of an implementation of any apparatus implementation. a method or process implementation, or even merely a variation of any element of these.

Particularly, it should be understood that as the disclosure relates to elements of the disclosure, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this disclosure is entitled.

It should be understood that all actions may be expressed as a means for taking that action or as an element which causes that action.

Similarly, each physical element disclosed should be understood to encompass a disclosure of the action which that physical element facilitates.

Any patents, publications, or other references mentioned in this application for patent are hereby incorporated by reference. In addition, as to each term used it should be understood that unless its utilization in this application is inconsistent with such interpretation common dictionary definitions should be understood as incorporated for each term and all definitions, alternative terms, and synonyms such as contained in at least one of a standard technical dictionary recognized by artisans and the Random House Webster's Unabridged Dictionary, latest editions are hereby incorporated by reference.

To the extent that insubstantial substitutes are made, to the extent that the applicant did not in fact draft any claim so as to literally encompass any particular implementation, and to the extent otherwise applicable, the applicant should not be understood to have in any way intended to or actually relinquished such coverage as the applicant simply may not have been able to anticipate all eventualities: one skilled in the art, should not be reasonably expected to have drafted a claim that would have literally encompassed such alternative implementations.

Further, the use of the transitional phrase "comprising" is used to maintain the "'open-end" claims herein, according to traditional claim interpretation. Thus, unless the context requires otherwise, it should be understood that the term "compromise" or variations such as "comprises" or "comprising,'" are intended to imply the inclusion of a stated element or step or group of elements or steps but not the exclusion of any other element or step or group of elements or steps. Such terms should be interpreted in their most expansive forms so as to afford the applicant the broadest coverage legally permissible.

The invention claimed is:

1. A rotatable reactor comprising:
   an outer housing;
   a fuel containment insert (1000) configured to rotate within the outer housing;
   a solid fuel (600) inside the reactor (509) of the fuel containment insert;
   at least one liquid inlet in fluid communication with the containment insert;
   at least one atomizer in fluid communication with the liquid inlet;
   at least one hydrogen outlet in fluid communication with the containment insert;
   wherein at least one of the containment insert and the containment insert and liquid inlet are removable from the outer housing;

wherein the reactor comprises an outer shell (1201) and an inner shell (1202) which further contains a perforated core (1203) comprising perforations (1204), said core is configured to contain the solid fuel and allow byproducts produced during hydrolysis of the solid fuel to pass through the perforations of the perforated core.

2. The reactor of claim 1 wherein the solid fuel comprises fuel pellets, and the fuel pellets are between about 4 mm and about 15 mm in diameter.

3. The reactor of claim 1 further comprising a liquid reservoir (506) in fluid communication with the liquid inlet.

4. The reactor of claim 3 wherein the liquid reservoir further comprises:
- an electrical solenoid to open and close liquid flow to the liquid inlet; and,
- an end cap (513) with an external portion (513') and a plunger portion (513") the plunger portion being driven by a spring (512) configured to pressurize the fluid reservoir.

5. The reactor of 1 further comprising a fluid pump in fluid communication with a fluid supply and the liquid inlet.

6. The reactor of claim 1 further comprising at least one turbidity fixtures (602) and stirring element (604) formed as part of or affixed to an interior surface (510) of the reactor.

7. The reactor of claim 1 wherein solid the fuel comprises lithium aluminum hydride.

8. The reactor of claim 1 wherein solid the fuel comprises an admixture of lithium aluminum hydride and an additive comprising at least one of $AlCl_3$, $MgCl_2$, $BeCl_2$, $CuCl_2$, LiCl, NaCl, and KCl.

9. The reactor of claim 8 wherein the amount of additive in the admixture is between 5 wt.-% and 30 wt.-%.

* * * * *